United States Patent [19]
Walker

[11] Patent Number: 6,157,317
[45] Date of Patent: Dec. 5, 2000

[54] SECURE COMMUNICATION AND CONTROL SYSTEM FOR MONITORING, RECORDING, REPORTING AND/OR RESTRICTING UNAUTHORIZED USE OF VEHICLE.

[75] Inventor: Richard C. Walker, Waldorf, Md.

[73] Assignee: Kline and Walker LLC, Potomac, Md.

[21] Appl. No.: 08/975,140

[22] Filed: Nov. 20, 1997

Related U.S. Application Data

[60] Provisional application No. 60/032,217, Dec. 2, 1996.

[51] Int. Cl.[7] ....................................................... G08B 5/22
[52] U.S. Cl. .................. 340/825.44; 340/468; 307/10.3; 307/10.5
[58] Field of Search ............................... 340/426, 825.31, 340/825.34, 825.44, 825.69, 825.72, 468; 425.5; 180/167, 287, 169; 307/10.2, 10.3, 10.5, 10.6, 10; 455/31.2; 701/29, 35; 702/165; 123/327; 342/357

[56] References Cited

U.S. PATENT DOCUMENTS

| | | | |
|---|---|---|---|
| 4,803,646 | 2/1989 | Burke et al. .............................. | 702/165 |
| 5,113,427 | 5/1992 | Ryoichi et al. ..................... | 340/825.44 |
| 5,129,376 | 7/1992 | Parmley . | |
| 5,223,844 | 6/1993 | Mansell et al. ......................... | 342/357 |
| 5,357,438 | 10/1994 | Davidian . | |
| 5,465,079 | 11/1995 | Bouchard et al. . | |
| 5,479,157 | 12/1995 | Suman et al. ...................... | 340/825.44 |
| 5,490,200 | 2/1996 | Snyder et al. . | |
| 5,499,182 | 3/1996 | Ousborne . | |
| 5,581,464 | 12/1996 | Woll et al. . | |
| 5,588,038 | 12/1996 | Snyder . | |
| 5,608,655 | 3/1997 | Moughanni et al. . | |
| 5,652,564 | 7/1997 | Winbush . | |

FOREIGN PATENT DOCUMENTS

WO 97/36772  10/1997  European Pat. Off. .

*Primary Examiner*—Howard L. Williams
*Assistant Examiner*—Jean B. Jeanglaude
*Attorney, Agent, or Firm*—Iran H. Donner; Hale and Dorr LLP

[57] ABSTRACT

A stop and control box houses the standard phone pager (a COTS APPLICATION—meaning commercial off the shelf) as a stimulating and communication device in either a secured and/or concealed mechanical lockup or in any protected area that employs any means to limit access. This protected area would also house control circuitry and could house monitoring circuitry to interface with and record the host machine's functions and finally record the operator and occupant's activities. The stop and control box accomplishes its remote capabilities in a number of ways from actually being wired directly to the pagers circuitry to merely sensing or reading the pager functions and numerical messages.

39 Claims, 16 Drawing Sheets

SECURE COMMUNICATION AND CONTROL SYSTEM FOR MONITORING, RECORDING, REPORTING AND/OR RESTRICTING UNAUTHORIZED USE OF VEHICLE.

RELATED APPLICATIONS

This application claims priority from U.S. provisional application Ser. No. 60/032,217, filed on Dec. 2, 1996, incorporated herein by reference.

BACKGROUND OF THE INVENTION

1. Field of the Invention

The present invention generally relates to a system and method for monitoring, recording, reporting and/or restricting unauthorized use of, for example, a vehicle, and more specifically, the present invention relates to a secure communication and control system and method for monitoring, recording, reporting and/or restricting unauthorized use of external devices, systems and the like.

2. Description of the Related Art

Car-jackings and vehicle theft have become a serious problem, especially in the past few years. Many vehicle theft prevention systems for automobiles, trucks, and boats are known and presently used. As indicated in U.S. Pat. No. 5,490,200, incorporated herein by reference, these systems fall into three general classes: physical locking devices, alarm systems, and systems for shutting-down the vehicle. Nevertheless, vehicle thieves and car-jackets have conducted a running, and mainly winning, battle with such theft prevention systems.

Physical locking devices constitute the first class of vehicle theft prevention systems. An example of such a device is THE CLUB, which includes a metallic shaft and a locking mechanism located on the shaft. THE CLUB attaches to the steering wheel of a car or truck and, while attached, inhibits movement of the steering wheel. Thieves, however, can easily defeat THE CLUB and other physical locking devices, for example, by simply spraying freon into the locking mechanism and striking the lock with sufficient force to break it. The physical locking device can then be easily removed from the steering wheel.

Falling within the second class, myriad alarm systems exist for preventing vehicle theft. Such systems operate to deter a thief before the thief undertakes to steal a vehicle. Alarm systems employ various deterrence methods, including sound and visual alarms. Nevertheless, thieves can easily disable alarm systems, thereby rendering them ineffective, even useless in some cases. Even if not disabled, a thief can allow the alarm to activate and simply drive away in the vehicle while the alarm is sounding. Thus, alarm systems cannot generally counteract a determined thief.

The third class includes various systems for shutting-down a vehicle. For example, some systems work in conjunction with law-enforcement agencies, by which the agency can remotely shut-down the vehicle. Such systems, therefore, require intervention by the agency and thus cannot be implemented by the vehicle owner without some assistance. In a similar system, the vehicle owner must call a central service, which can then transmit a signal over a satellite network to disable the vehicle's engine. However, as stated in U.S. Pat. No. 5,490,200, law-enforcement and central service systems require the vehicle owner to invest in expensive electronic components for installation in the vehicle and only work in a covered "local" area.

To remedy the above problems, U.S. Pat. No. 5,490,200 triggers a switch in the vehicle using a tripping circuit. The system includes a pager unit for receiving a wireless communication and for generating a first signal in response to receiving the wireless communication. The wireless communication is transmitted by a transmitter to a central switching unit, and from the central switching unit, the wireless communication is relayed through a satellite to the pager unit. The tripping circuit, responsive to the first signal, generates a second signal, and a switch, responsive to the second signal, is tripped causing an action in the vehicle. However, this patent only provides a crude method of tripping a switch in a vehicle, which I have determined, may be dangerous in situations where the vehicle is moving at a fast speed.

To avoid the limitations of a paging unit, U.S. Pat. No. 5,608,655, incorporated herein by reference, discloses a wireless paging device able to control an electronic device at a remote location using a data processor. The wireless paging device includes a receiver, such as those typically used in pagers, to detect when a particular electronic device is being remotely accessed. If the electronic device is being remotely accessed, a data processing system stores an incoming message in a buffer and subsequently determines if the incoming message is a command or another type of communication. The data processing system processes a command to provide the proper control signals for controlling the functionality of the electronic device. This patent specifically states that due to restrictions in size, pagers are often not capable of executing more complex functions such as controlling operation of devices or communicating large amounts of data, and therefore, a data processor is used.

U.S. Pat. No. 5,479,157 relates to a receiver, demodulator and control circuit which interfaces with various vehicle options to allow receipt of a vehicle address and control signal which is a personalization code to control the operation of one or more vehicle accessories. A display is provided for the display of information to the vehicle operator confirming the state of operation of an option change or addition when has been requested by the vehicle operator. The vehicle includes a display for displaying a telephone number from a land-based paging system to the vehicle operator. In another embodiment, the receiver demodulator and display unit receives alpha-numeric information when allows messages and/or telephone numbers to be displayed to the vehicle operator. In yet a further embodiment, one vehicle personalization control system provides anti-theft protection such that upon receipt of a predetermined code, once the vehicle ignition has been turned off, the vehicle cannot be restarted.

As indicated in the U.S. Pat. No. 5,479,157 patent, the control system cannot be used until the vehicle ignition has been turned off, to prevent deactivating the vehicle when not turned off. Thus, I have determined, that this patent does not address the situation when the vehicle is moving and/or not turned off.

It is therefore desirable to provide a system and method that may prevent unauthorized use of a vehicle accounting for the possibility of the vehicle being in motion. It is also desirable to provide a system and method that controls various components and/or systems in a vehicle using a simple, inexpensive, paging device.

SUMMARY OF THE INVENTION

With all the carjackings, drunk and aggressive drivers, dangerous high speed chases aggressive and medical emergencies that take place every day, it is long over due for society to have better control over its machinery and the irresponsible members of its society. The stop and control box or secure communication and control system for monitoring, recording, reporting and/or restricting unauthorized use of vehicle of the present invention in its simplest form can accomplish this economically with the technology that exists today.

But with the future needs of our society to control all of our technology, remote control is only one of the most crucial aspects that this invention presents. There are equally as important to our nation and world security much more to this invention than stopping a stolen car in real-time. And while this pager as a remote control device has great inexpensive value and now is more practical because of the increase in its range (nationwide), there are so many more advance transceiver systems and other devices that will decrease in cost in the near future and should be combined into a system of devices. The most important issues facing these anti-crime system and monitoring devices in the future are security and legal issues. This invention's secure, combination of control (remote and on board) and data storage systems speaks directly to society's needs for today and this next century, and the ongoing evolution of shared duties and responsibilities between man and machine.

A great deal of the devices and circuits exist today for the most part as COTS. However, the unique coupling and individual designs shown here in this patent and the stated reasons for securing all of these pieces of equipment and circuits in one specified secure system are what make up the total uniqueness of this invention.

Due to the continued advances in all equipment to be controlled electrically with advanced digital communications (most apparent in the automotive industry), it has become technically possible with reasonable expense to record and/or report these data streams either going to the out reach functions or retrieve any return data from on board sensors etc., used to control these mechanical functions or report back on the effects of their actions and make this information available for the interpretation by the proper persons to report in the appropriate settings on any malfunction either due to equipment failure or operator misdirection.

Because of the present technical growth along with society's real need to assign accountability for the actions of man and machine as artificial intelligence vies for greater control of our equipment and vehicles, we are confronted with the real need for a black box system as is used in the aircraft industry today. Which can give stored vital data and simultaneous driver voice comments (for either mechanical repair, equipment evaluation, and operator performance) or it can aid in a vehicle altercation investigation to answer vital safety questions as to equipment activities and human actions to help decide first the causes and then what insurances should pay for what. As these technologies vie for more control over man's machines, these devices are beneficially combined and secured from damage and tampering in a legally controlled area or areas in the future.

This invention can take this neutral position to the furthest informative level by furnishing protected information through recording of what transpired with man machine and environment at the time of any particular vehicular incident. All would have complete access to this protected information prior to, for example, any court action to reduce the unnecessary use of the legal system and properly prepare for any proceedings.

The present invention can be accomplished by either sensing pager functions and/or messages or by being wired directly from the pager to the stop box interface. The present invention can simply respond to a dialed in phone number and need no numerical message information to complete a set of preprogrammed functions on the host piece of equipment as determined by the box's control circuitry.

I have decided to make a very simple system for three basic reasons. First it is easy for the technically unsophisticated to visualize and understand how it works. Secondly I can show all the future developments without incurring unnecessary R&D costs, and thirdly it allows me to sell some of the licenses immediately.

The present invention primarily functions to stop a vehicle through three repetitive phone activations. However, they will preferably be sensed, not hard wired, although this is also possible (to display the COTS usage of the standard pager). It will safely stop the vehicle in real-time and inexpensively through a mini computer that can count three separate phone calls either by the beep sound or the specific vibration. Then it will send 12 vdc form control relays to three separate lp lock off valves and accompanying flow control needle valves plumbed together and assembled from the COTS part list below.

It is therefore a feature and advantage of the present invention to provide a system and method that may prevent unauthorized use of a vehicle. It is also a feature and advantage of the present invention to provide a system and method that controls various components and/or systems in a vehicle.

It is another feature and advantage of the present invention to monitoring, recording, reporting and/or restricting unauthorized use of vehicle.

In accordance with one embodiment of the invention, a real-time vehicle recovery method is administered in a stop and control box. The method restricts unauthorized use of a vehicle. The method includes the steps of receiving a page signal request initiated by a user via a receiver of a pager. The page signal request indicates that the vehicle is being used in an unauthorized manner. The method also includes the steps of outputting an output signal indicative of the page signal request from the pager, and receiving the output signal via a controller. The method also includes the step of terminating power to the vehicle to bring the vehicle to a stop, terminating fuel to the vehicle to bring the vehicle to a stop, reducing fuel or energy to the vehicle to slow the vehicle down, and/or selectively terminating and/or reducing power to at least one energized system in the vehicle used to at least one of control, propel and drive the vehicle, via the controller.

In accordance with another embodiment of the invention, a real-time vehicle recovery system is administered in a stop and control box. The system includes a pager having a receiver receiving a page signal request initiated by a user and an output port outputting an output signal indicative of the page signal request. The page signal request indicates that the vehicle is to be controlled or operations relating to the vehicle are to be recorded in a predetermined manner. The system also includes a controller receiving the output signal and controlling the vehicle and/or recording the operations of the vehicle responsive to the output signal.

BEST MODE FOR CARRYING OUT THE INVENTION

Figure 1:
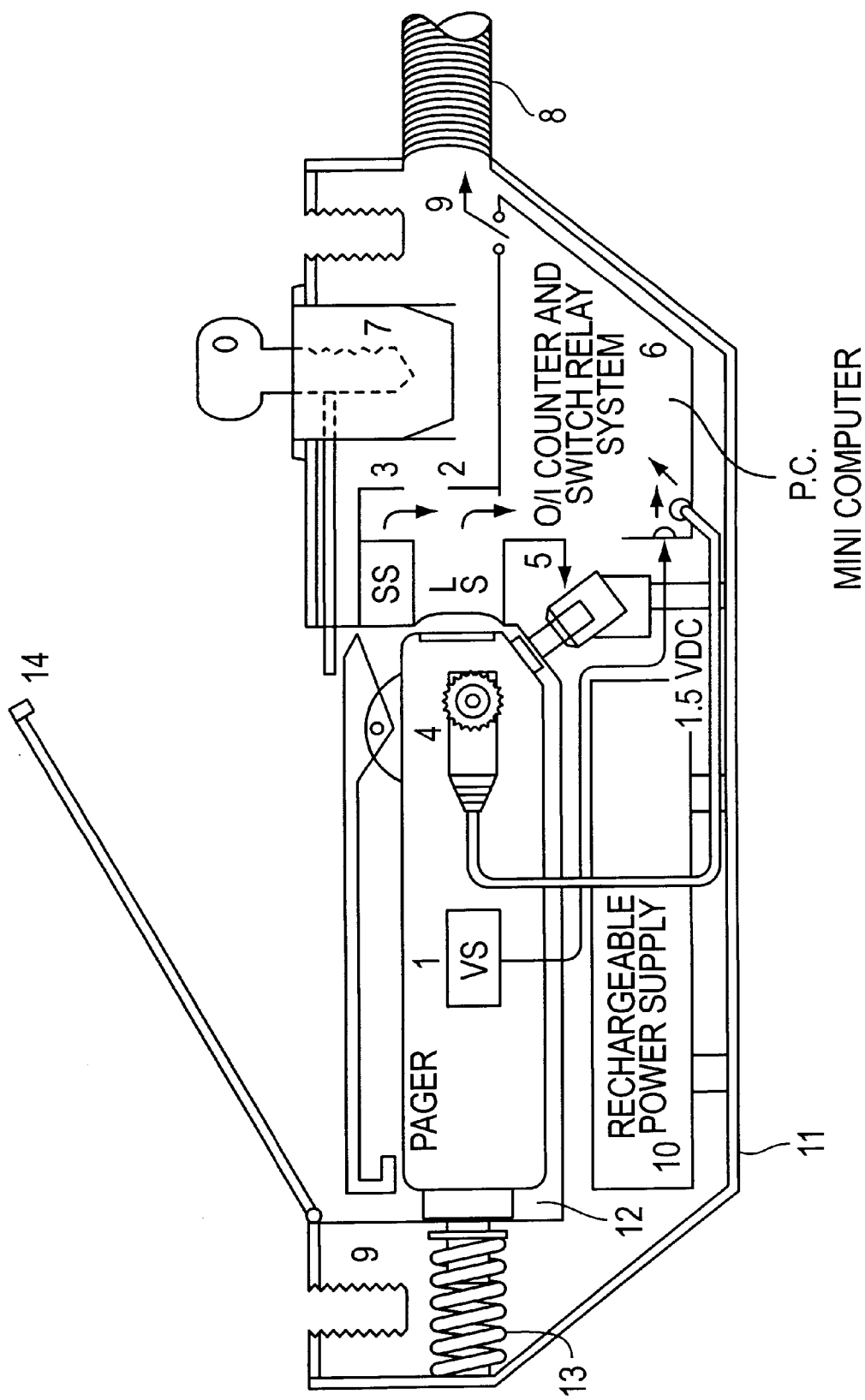
FIG. 1 is a complete representation of the first device embodiment with all its variations.

The stop box of the present invention restricts the unauthorized use or uses of equipment and vehicles and monitors their functions. To initially accomplish this the stop box system uses the standard pager's activities to stimulate remote control functions on mobile and stationary equipment/machinery, where phone lines and hard wiring are not practical. Additionally, it can be used as a backup to these systems if this is so desired.

This invention has two major device embodiments and one major system embodiment with two levels to monitor/record and remotely control the equipment. The first major device (least secure) performs the simple function of O/I. This can be accomplished several ways. One way is by accessing the beep or vibrator circuit in the pager and using the 1.5 VDC from the off-the-shelf pager and causing it to activate two 12 VDC relays (this example is for normal car voltage) which then could control any on/off functions desired on the remote equipment/machinery, when the pager is activated. Of course, other voltages may be used to activate other relays types to control on/off functions for different equipment, vehicles and/or machinery with different voltage requirements.

Part of this exemplary circuit will employ a 1/32 mic. jack, suitable substitute, or (this invention's exclusive battery peg system) which will allow the standard pager to interface its activations or access data received and be correlated with remote functions on a piece of equipment through the stop box. According to one design, there will be one resistor, one transistor, one diode and two relays, a programmable counter (electrical, mechanical or solid state). The electrical values of these specific components are determined in accordance with interface to the machine being controlled. These components used for voltage conversion for interfacing with the vehicle systems are housed in a secure lock up box, which holds the standard commercial pager with one of these connector conversions wired directly to this type of amplifying circuit. The amplifying circuit cab then activate any number of standard disabling devices or equipment shut down systems currently on the market.

The second way this first device embodiment will be accomplished is by sensors in the secure processor box which can detect when either the pager light old style is activated, or the vibrator is energized, or by acoustic sensing, or finally any combination of the above pager functions as may be desired. The invention optionally activates on sound and vibration. Using more than one sensor in the lock box may provide the additional security of an integrity check among sensors (not available today). For example, the pager light and vibrator may be simultaneously used together. If only the light sensor indicates that the page request has been received from the pager, then the system can consider the page request as a error, until both the vibrator and light sensor indicate that a page request has been received.

This second design of the first embodiment is accomplished with no modification of the pager, i.e., a complete (C.O.T.S. application); it merely needs to be secured in the stop box on the vehicle or machine in the "on" position. The uniquely secured processing system in this protected case could have its own electrical power source for primary control circuits which also would be able to supply 1.5 vdc to the pager through this inventions unique battery peg system desired below (power contacts only), and finally use the equipment's electrical systems to complete the output functions desired; or it could completely rely on the equipments electrical energy if so desired or use the emergency power source if the machine electrical service has been compromised. Of course economics (system cost) versus security are some of the possible trade offs in using the variations of this patent.

The second major device embodiment of this invention is a more secure series of devices that can discriminate more accurately and have increased and more flexible as well as varied function capabilities. It employs the pagers LCD display system or electronic message data system by direct wiring or visually reading the LCD and then connecting through a decoder or EPROM reader (erasable programmable memory)or scanning device in the (Stop box). This device then interfaces or transmits internally to a processing center this information which in turn activates preprogrammed functions through either any on board programmed controllers, processors, computers or electrical circuits which exist on many different pieces of equipment today or the stop box can send the appropriate current to complete the proper emergency function from its own self contained power source. (Note: as has been described and displayed throughout this patent, any control circuitry will be determined by the needs of the host piece of equipment, and the way the message information is gathered plus any special demands of the functions desired on the host piece of equipment.

For older equipment, a simple preprogrammed control circuit would be designed containing the appropriate switches compatible to the machines' electrical system and housed in the secure lock up box.

The first variation of the second device would employ a multi-pin physical connector, tied into the LCD display ribbon of the pager, which then jacks into its male counterpart inside the secure processor box on the equipment. This male jack then connects directly to the EPROM reader or decoder which is enclosed in the lock up box.

In accordance with another embodiment of the invention, a battery peg multipin connector or beeper test pins in the bottom of the beeper, as well as a power supply for the beeper/pager, serves as an electrical link from either the 8 pin message receiver portion of the beeper or from the 29 pin contact to the ribbon that services the LCD display. In either case, these messages would be processed appropriately (e.g., decoded and reformatted into the appropriate encoded digital language and/or used to send the correct current to finally, signal the programmed controller either already existing as is the case with new cars, etc., or to any control circuitry housed in the lock box or secured on a host piece of equipment tailored for a specific machine needs, or for older vehicles, etc.). These messages can be highly specific and variable. The specific functions that the invention provides are described in detail below.

A second variation of this second major device embodiment would be accomplished by using any optical sensor (e.g., optical transducers-linear arrays, readers, scanners, video cameras, new computer chip cameras, decoders, and the like) which are capable of reading the digital display with recognition and sending an electrical signal to the processing unit inside the lockup box, or capable of interfacing with any other device processors available which have separate functions but whose circuitry and program flexibility can accommodate this process to translate this pager message into a control signal and transfer the control signal to a function as desired. If the stop and control boxes varied processing systems are employed, the page data stream will finally go to the on board computer or cpu either secured in the lockup or tied into the vehicles computer for the functions desired. This variation for the second major device embodiment will also allow the use of the pager without any modification, and would only require securing the pager in the on position in the secured interface/processor box within or on the equipment to be controlled.

The third major embodiment of this invention involves varying levels of interactive monitoring. The degree of monitoring is determined by which device is being used. And it is the properties and capabilities of the devices described in the first two major device embodiments that govern this present systems capabilities. But the third embodiment, the interactive network; will create, control and manage the most massive linked network of diverse devices, circuits, software and equipment. There by creating the most informative and responsible set of services and communicative capacity to meet the needs of the general public and their machines of today and the future in every industry. These services will be many of the developing businesses of the future. This invention can monitor, control and record. For man's control this can be the best advancement for man and machine since the birth of the industrial revolution. And it can help usher in the up coming technological changes in the most reasonable economic manner.

The initial system employs only the on/off function of the first device embodiment with either the hard wiring connector conversions or the non-invasive sensor system. However by using the battery peg connector system it would be possible to access the coded message functions of the beeper. This device is mounted on a piece of equipment and tied into a shut down system or shutdown mode in the equipments computer and could be activated by a phone call to a commercial paging company and the machine would be rendered nonfunctional. A second call could once again activate the equipment if so desired. In the most rudimentary way simply by counting the number of activations it would be possible to preprogram separate functions even without relying on the coded message capability of the pager.

This first system and device embodiment would be an excellent way for rental equipment companies, leasing firms, banks, service companies, and utility companies to insure that the operation of their equipment matched their receivables in payment. This level of system and its equipment could be privately owned, or leased, and operated by the above companies or a private firm that sells or leases the equipment and activates it upon request.

The second level system would incorporate the second major device which would offer many options to its user. It could be used for security to shut the equipment off, vary its operation or any of its functions (such as auto speed). It could turn on tracking systems (e.g., Lojack GPS, and the like). It could activate on board cell phone systems and modems that could return information to the system monitoring this piece of equipment. It could activate alarm systems and control any on board computers through the digital data received by the pager in the lock box. It is a major intention of this patent and most ideal logical modality to secure any and all telecommunication equipment (i.e., cell phone technologies, modems, transmitters, receivers) locating equipment (i.e., lojack GPS lorand), processors (CPU controllers or control circuitry encoders decoders) security components, recording systems within a secure containment in the same manner as has been described for the pager and any evolution or varied configuration of a secure containment for this general purpose should be considered within the nature and scope of this invention.

This variation could be useful to law enforcement and equipment owners to find stolen vehicles and help apprehend criminals in the act of stealing the equipment and even aid in their prosection by activating a recorder system at the time of theft. This service and equipment could be sold or leased by pager companies, security firms, a phone system company, utilities, a government municipality, or a private entity (like oil companies). It also could effectively be used by car, equipment manufactures and service centers to diagnose, analyze, adjust or augment functions in the field as may be desired. Also the ability to record data will evolve to aid the legal system in assigning liability and personal accountability. And of course all the previously mentioned commercial uses for the first embodiment especially the property to bill for the amount of time a particular piece of equipment has been used.

FIG. 1 is a complete representation of the first device embodiment with all its variations. The component parts are as follows. No. 1 is an optional vibration sensor or detector, No. 2 is an optional light sensor or detector, No. 3 is a sound sensor and No. 4 is a mic jack in side wall of pager, all of which are wired directly to part #6 the (electronic counter switching system). Any one of the first four parts, Nos. 1–4, can be used to activate part, No. 6 the control area or C.S.C. by an incoming phone page. Or any combination of detectors could be employed simultaneously to increase the systems discriminatory capacity. The first three sensor parts Nos. 1–3 listed above allow the standard pager to be employed with no alteration to the pager unit.

The inventor recommends a combination of two or more of the three sensors be used in a series circuit. This would require the simultaneous activation of two or more sensors before part (No. 6) will respond. This will help insure that other local stimulus will not activate these variations of the first embodiment prematurely.

When only part No. 4 is employed, i.e., the direct jack system, the hardwiring will carry the pager's current (1.5 vdc) directly to part No. 6. In this case part No. 6 will house a voltage amplifying circuit like the one depicted in FIG. 2 or a current sensing device, along with the counter and switching circuits (both the counter and switching circuits are preferably ICs) or in our prototype a mini computer.

Figure 2:
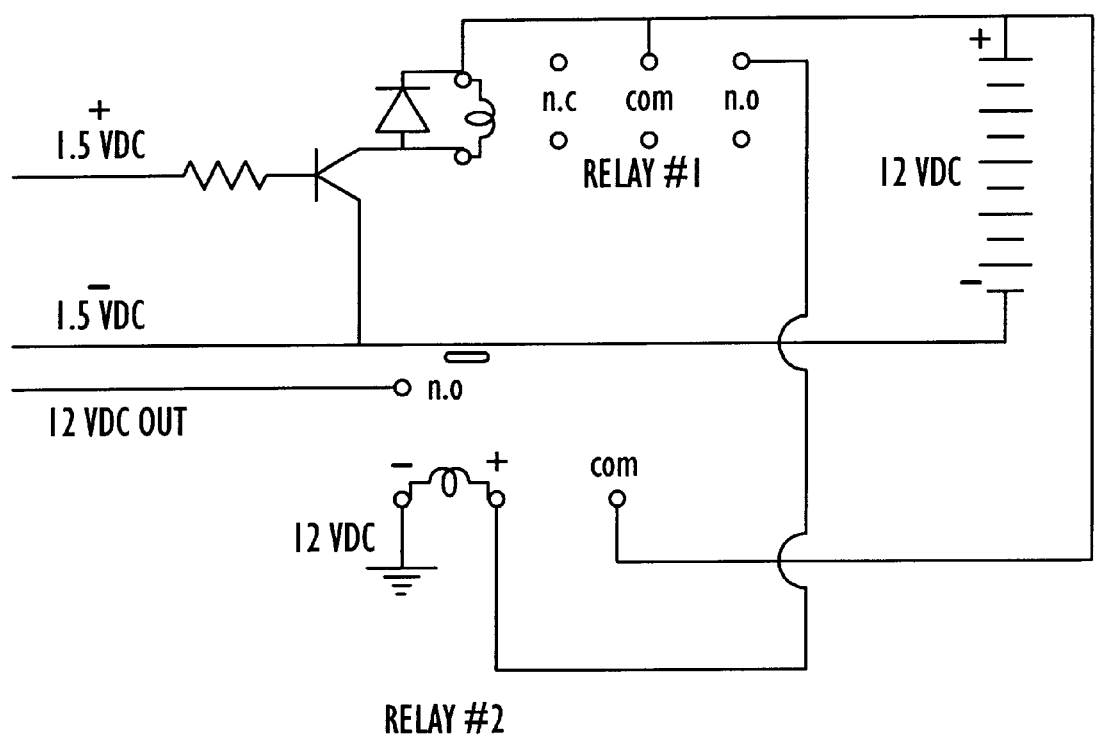
FIG. 2 illustrates a voltage amplifying circuit that can be structured for many different types of equipment and can be altered for various secondary current demands.

However, one variation of the first embodiment device is completely illustrated in FIGS. 1 and 2 using only the single function of on/off for the host equipment being controlled to be either active or rendered inactive. This system will simultaneously activate optional part No. 5 with each page. Part No. 5 is the optional solenoid plunger that clears the pager system (also an optional relay to cut power to the power peg). Other means of clearing the pager system are also available. This makes the next pager activation a new fresh page which will reverse the function of the prior page. So for this application, no counter is needed in the control galley which is labeled part No. 6 in FIG. 1. (Note: this galley area part No. 6 in FIG. 1 and part 7 in FIGS. 6 and 7 of the second embodiment will change in name and function. That is, the same reference numerals may indicate functionally similar parts using different names as indicated in the description of each figure).

Part No. 7 in FIG. 1 is a key switch that locks the lock box door No. 14 and also optionally electrically activates the lock box assembly. No. 8 is a shielded cable that is covered with a spring winding rendering it difficult to violate. No. 9 is 5/16 uss. grd. 8 one directional round screws and threaded socket. No. 10 is emergency power supply that is recharged all the time. It can supply all power necessary to operate the lock box and also power all emergency functions (e.g.: equipment shutdown systems). No. 11 is the entire case housing made of 3/16 steel and shielded composite ports enough to allow the microwave signal to penetrate the lock box assembly and activate the pager inside. No. 12 is an optional spring loaded plunger to insure the proper location of the pager in the optional lock box unit in the illustrated optional configuration. No. 13 is the spring that gives the tension to No. 12 the plunger. No. 14 is the door that is anchored on one end by a piano hinge, for example, welded or molded into the case housing No. 11 and the door itself.

The other end of the door is anchored to the case housing No. 11 in the closed position by a 3/16 piece of flat steel (dead bolt style) projected into a slot in the door itself No. 14 by the turning of the key. This will prevent most unauthorized access.

FIG. 2 illustrates a voltage amplifying circuit that can be structured for many different types of equipment and can be altered for various secondary current demands. The secondary voltage example in this diagram is set at 12 vdc (normal car voltage). This circuit basically is using the 1.5 vdc from the pager's beep, light, or vibrator circuit accessed by the 1/32 mic jack in the side wall of the pager shown as No. 4 in FIG. 1 and delivering this current by means of hard wiring to part No. 6 area in FIG. 1 where this amplifying circuit is housed.

FIG. 2 shows the +1.5 vdc entering and passing through a resistor then to a transistor where it is connected to the transistor's collector terminal. The base terminal of the transistor is wired to the coil of the No. 1 relay. The other terminal of the relay coil is wired to the positive side of the equipment power. The negative side of the 1.5 vdc pager current is connected to the negative side of the machine current. There is a diode across the terminals allowing current only to be fed in one direction to protect the transistor. The emitter terminal of the transistor is wired to the negative or common side of the machine's power circuit which causes the 1.5 vdc to be amplified to 12 vdc in the circuit shown in FIG. 1. This activates Relay No. 1 which now activates relay 2 already serviced with +12 vdc to one of it's open contacts. This creates a simple on and off switching application that now can switch functions at the machines' voltage level when the pager's 1.5 vdc is applied to the circuit.

There can be many more relays to complete more functions simultaneously. And there can be an optional counter connected to isolate these functions, or the No. 2 relays system can be replaced along with the counter by an solid state I.C. (integrated circuit) right after the current is amplified to the I.C. circuit's demands. And finally amplified to the machine's functional current level if need be. (I.C. circuit and counters to be described later in FIG. 4). All component electrical parts must be compatible with the host machine's standard electrical and consumer needs on an individual basis.

Figure 3:
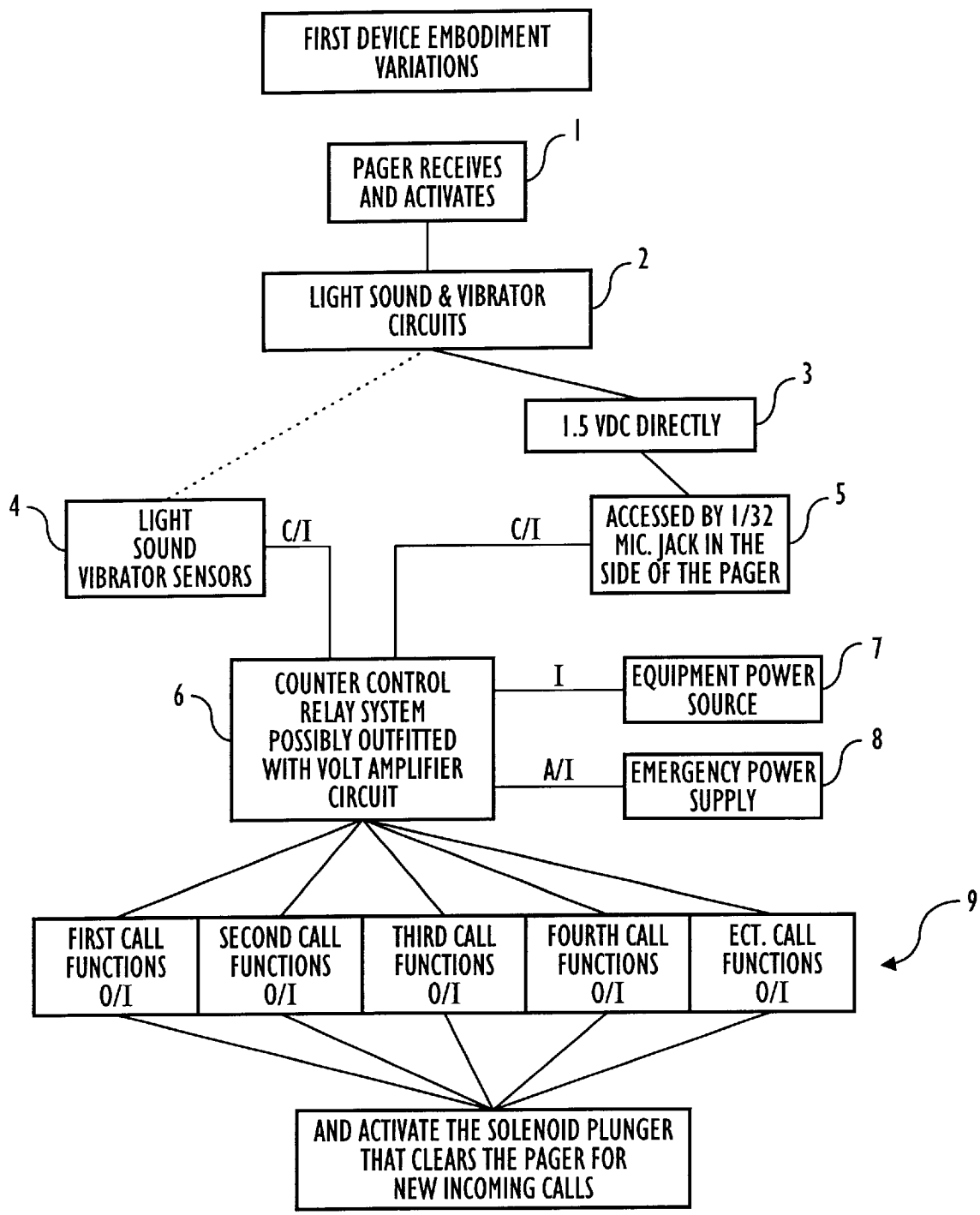
FIG. 3 illustrates the functional flow of the first device embodiment.

FIG. 3 illustrates the functional flow of the first device embodiment. As is shown in the first square or box 1, the pager has it's light, sound and vibrator circuits activated by a phone call in the second square. From here the sensors as displayed in FIG. 1 parts numbered or labeled: 1 or vs, 2 or ls, and 3 or ss sense these circuits activated. They are then routed to counter control relay and volt amplifying systems part location No. 6 in FIG. 1.

This pager signal also could be recognized by the hard wiring jack type system displayed as part No. 4 in FIG. 1 with the 1/32 mic jack (or battery peg or serial connector; route displayed as the third and fifth boxes 3, 5 on the right in FIG. 3). In this case the voltage amplifying circuit (in FIG. 2) would probably be employed in the control area part No. 6 in FIG. 1 and optional box No. 6 in FIG. 3, unless mini computer pin was set to latch on this voltage. The sensors displayed in box 4 on the left of FIG. 3 could operate at machine voltage or any control circuit voltages as needed. Boxes 7 and 8 on the right side show the current available from either the equipment or an emergency back up power source housed in the processor lock box part No. 10 in FIG. 1.

From box No. 6 in FIG. 3, the varied functions of on and off are displayed in the five box bar 9 on FIG. 3. And the last box shows that at the time each function is performed the clear optional may be power switch/or current interpretation to the pager plunger solenoid is activated No. 5 in FIG. 1 preparing the systems to respond to a new phone page.

Figure 4:
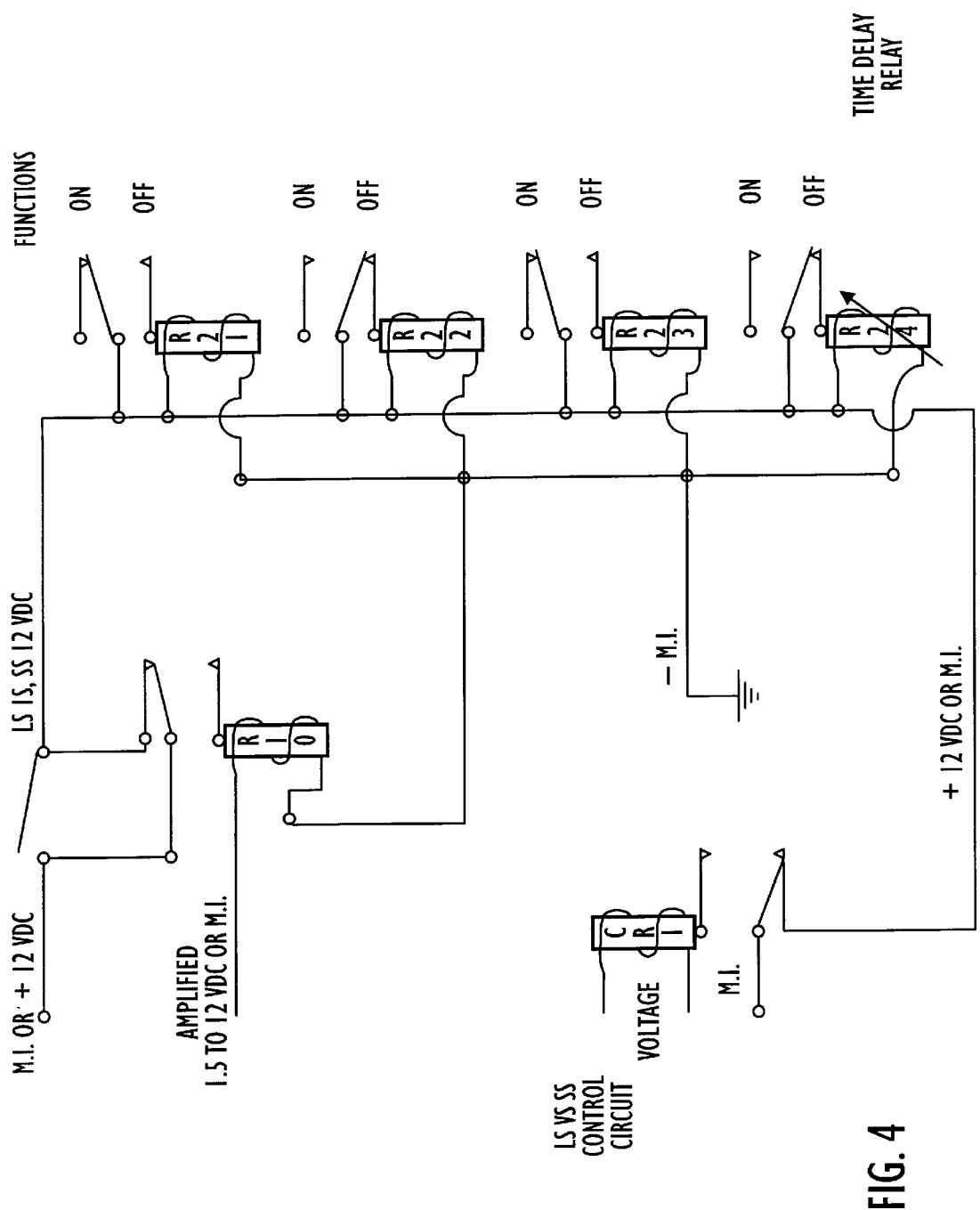
FIG. 4 shows the simple electrical relays system that could be employed with the voltage amplifier described in FIG. 2 and option 2 of FIG. 4.

FIG. 4 shows the simple electrical relays system that could be employed with the voltage amplifier described in FIG. 2 and option 2 in FIG. 4. These relays could be used with sensors that operate at the host machines voltage in an O/I fashion symbolized as a switch in option 1 indicated by the letters LS VS SS in FIG. 4. And option 3 allows the LS VS and SS sensors to be powered and controlled by a simple I.C. circuit which would control the CR1 relay, or computer.

All the R2 relays that control outgoing functions can vary in number as may be required by the needs of the host machine. The one R24 relay listed in the bottom of FIG. 4 would be activated and deactivated every time a page is received to clear the pager for new pages. This relay would also control the counting process and other relays programmed to be activated by certain number of pages would know when to respond.

Figure 5:
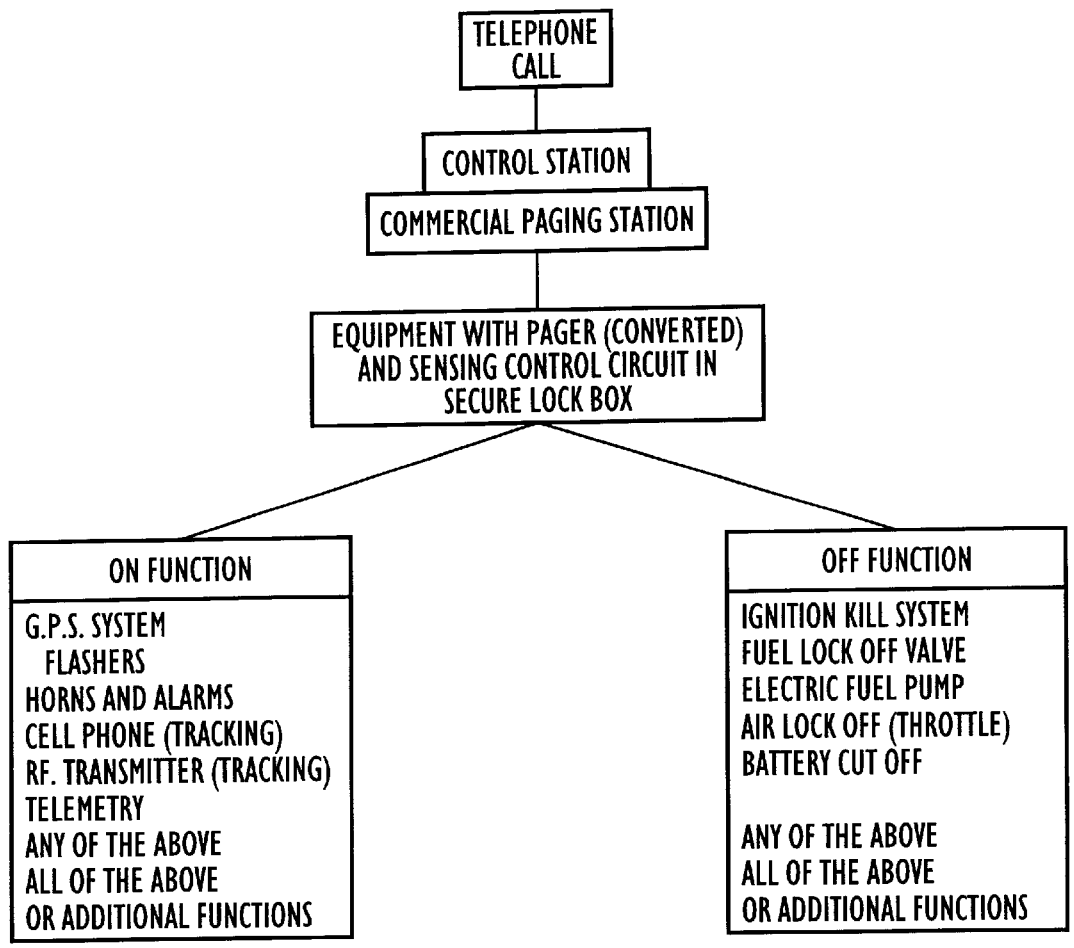
FIG. 5 is an illustration displaying the routing of a phone page and the possible functions that would be activated through the switching control area No. 6 in FIG. 1.

FIG. 5 is an illustration displaying the routing of a phone page and the possible functions that would be activated through the switching control area No. 6 in FIG. 1. This could be accomplished with micro relays and a counter or a solid state integrated circuit with switching and the counting in one circuit as displayed and named in FIG. 4.

The first box is the phone call of a customer of the third embodiment which is a control system if this is owned by a third party, say a commercial business, who may sell or lease these varied functions as services. The control station (box 2 in FIG. 5) can be by-passed entirely when the device embodiments have been privately purchased and are owned and operated by an individual or private company. Of course this would also necessitate the purchase of the beeper or pager separately.

In either case a phone call would be made to a commercial paging station displayed in box 3 in FIG. 5. This in turn would activate the sensing and control circuits described in FIGS. 1, 2, 4, which could activate and render active or inactive the functions displayed in the on/off function boxes at the bottom of FIG. 5.

Figure 6:
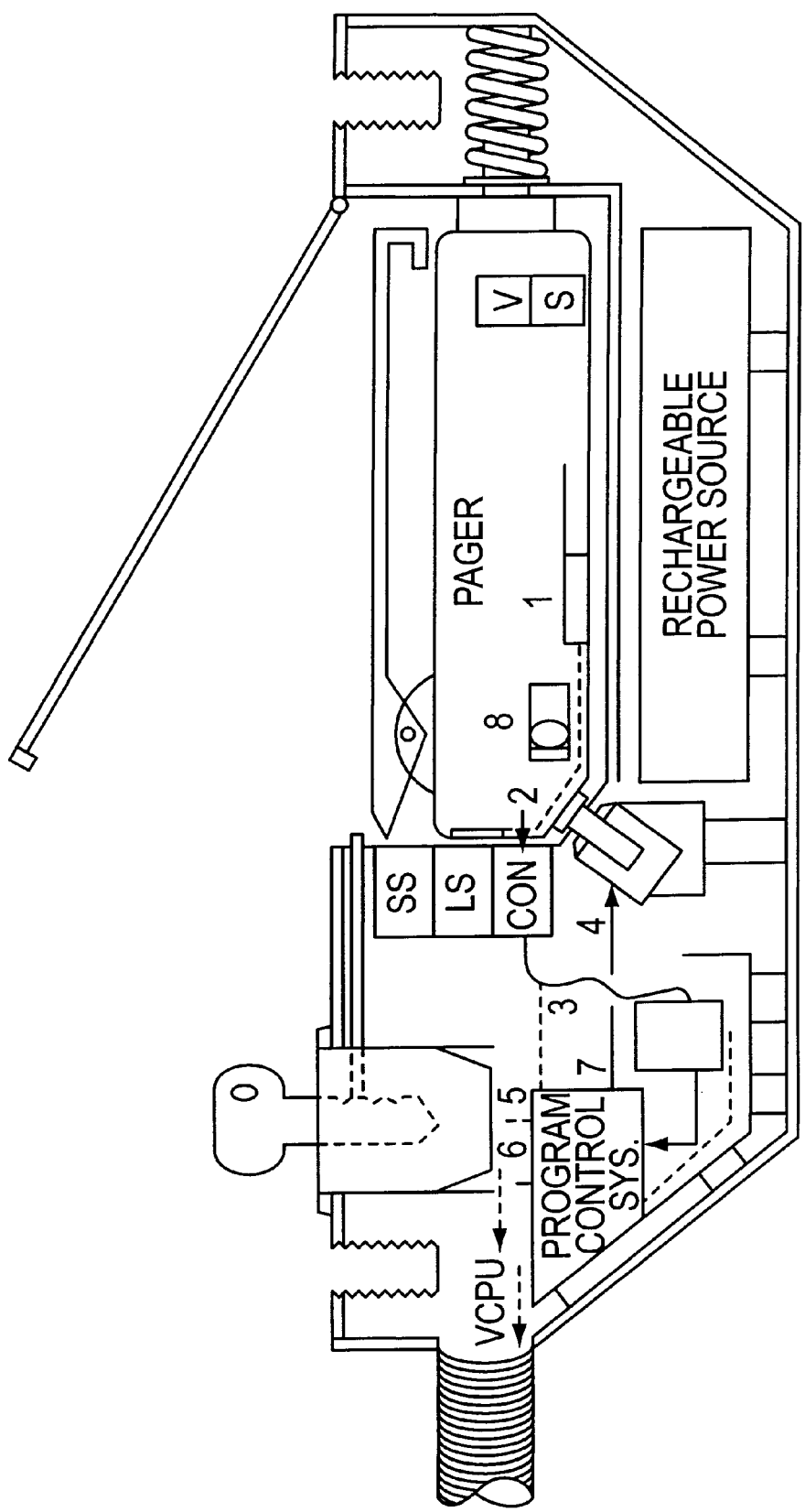
FIG. 6 shows the second device embodiment with a first set of variations.

FIG. 6 shows the second device embodiment with a first set of variations, and only the differences in the components will be discussed. No. 1 is a chip in the pager that turns the digital signal in to the proper binary code to run the display in the front of the pager through a ribbon of wires No. 2 in FIG. 6. No. 3 is a 29 pin micro connector that accesses this ribbon of wires No. 2 through the front of the pager. The wire is then sent to an analog to digital converter and onto a solid state programmable integrated circuit.

The solid state programmable integrated circuit is housed in part 7 area, and can either send digital signals to the machine's on board computer or send the proper machine voltage through thrysters, silicon relays, switches, servo motors, and/or wiring to the machine's parts and solenoids to control machine functions. Nos. 5 and 6 indicate these wiring options. No. 4 is the clear optional function solenoid plunger which activates on the command from the control system to process more coded messages stored in the pager and also clear the system to receive more new pages. This is also the same for the side mounted solenoid plunger No. 8, however, this is not shown here except for the round circle as a end view.

All other parts, the case, cables, power source area, spring plunger, and door lock mechanism is the same as the first embodiment. It is important to remember that not all of the sensors have to be employed, and that the power requirements of the circuit should generally be the same.

Figure 7:
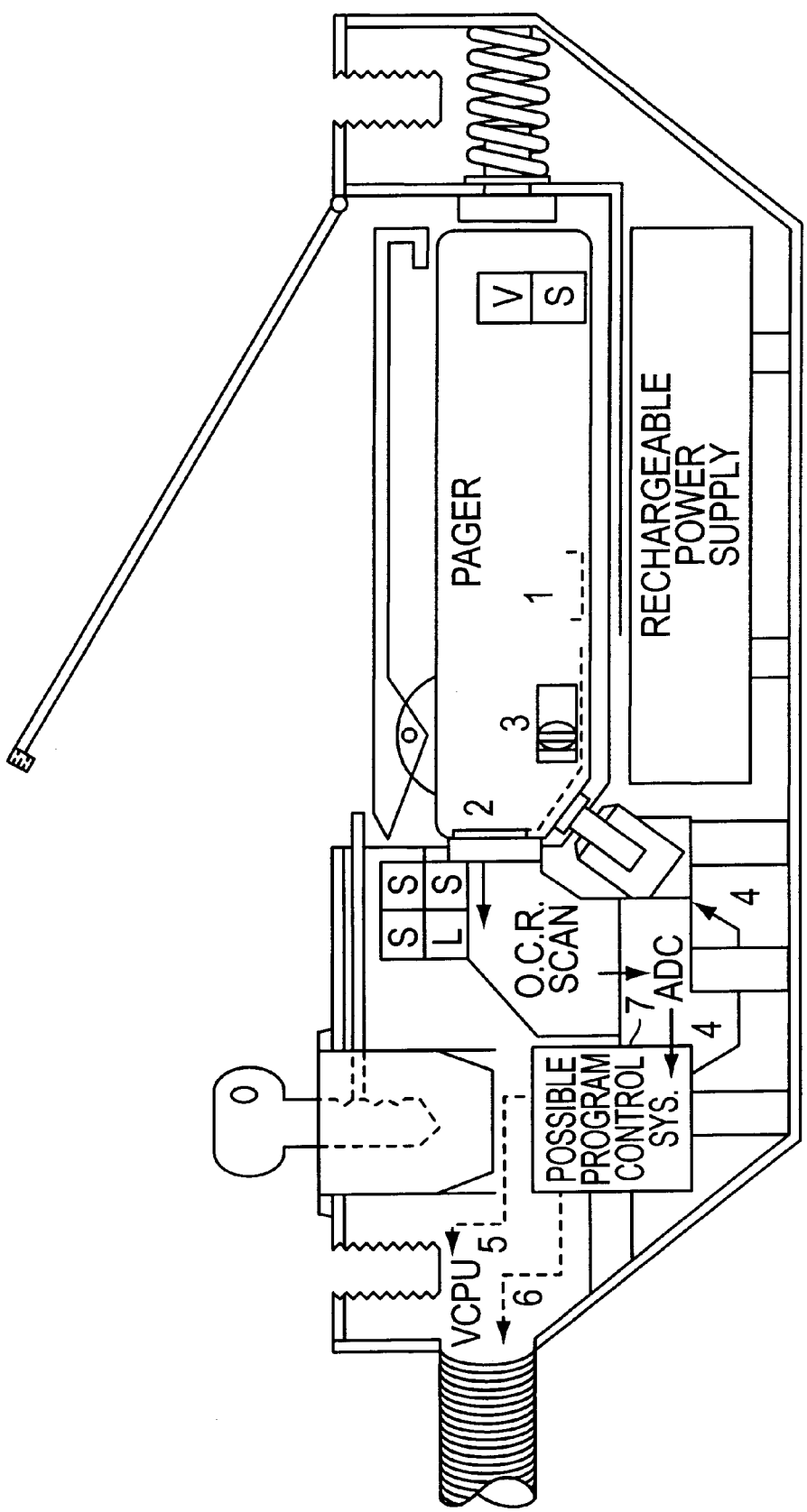
FIG. 7 is an illustration of another embodiment of the invention.

FIG. 7 is an illustration of another embodiment of the invention. In FIG. 7, most components of the system are similar. However, instead of a light sensor/detector, vibration detector and/or sound detector, an optical character recognizer (OCR) scanner is provided to read the alphanumeric characters that appear on the display of the standard pager. In this manner, codes or phrases may be transmitted over the standard pager and translated or utilized by the vehicle recovery system. Thus, if the page initiator requests that the engine be brought to an idle speed (discussed in detail below), the request may be transmitted to the pager alphanumerically as in a standard page request. For example, up to a six digit code may be transmitted to the pager for this function; because it is a U.S. standard to use seven or more digit telephone numbers when transmitting a standard phone message. In FIG. 7, two mini solenoid plungers are included, one of which activates the digital display of the pager device, and the other illuminates the display.

Figure 8:
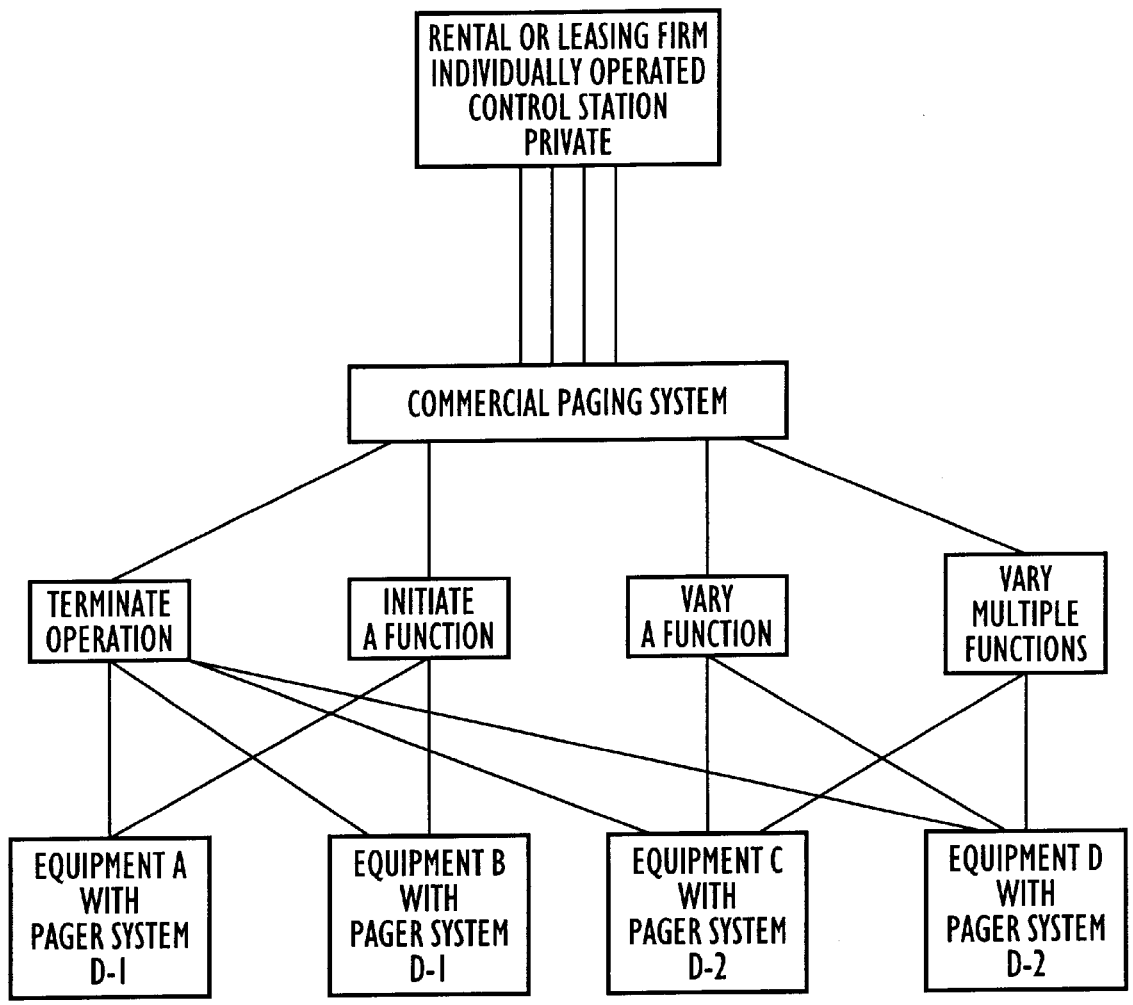
FIG. 8 illustrates various different functions and equipment that may be controlled using the real-time vehicle recovery and control system.

FIG. 8 illustrates various different functions and equipment that may be controlled using the real-time vehicle recovery and control system. In FIG. 8, equipment A–D are selectively controlled in accordance with the two device embodiments, plus the varying functions of, for example, terminate operation, initiate function, vary a function and/or vary multiple functions. A rental or leasing firm that is individually operated includes a separate control station that receives page requests via the receipt of a telephone call from a user of the system that has knowledge of the control/function codes utilized by the system. Upon receipt of the page request, the rental or leasing firm transmits the page request to the paging company for broadcast to the pager located in the vehicle.

Figure 9:
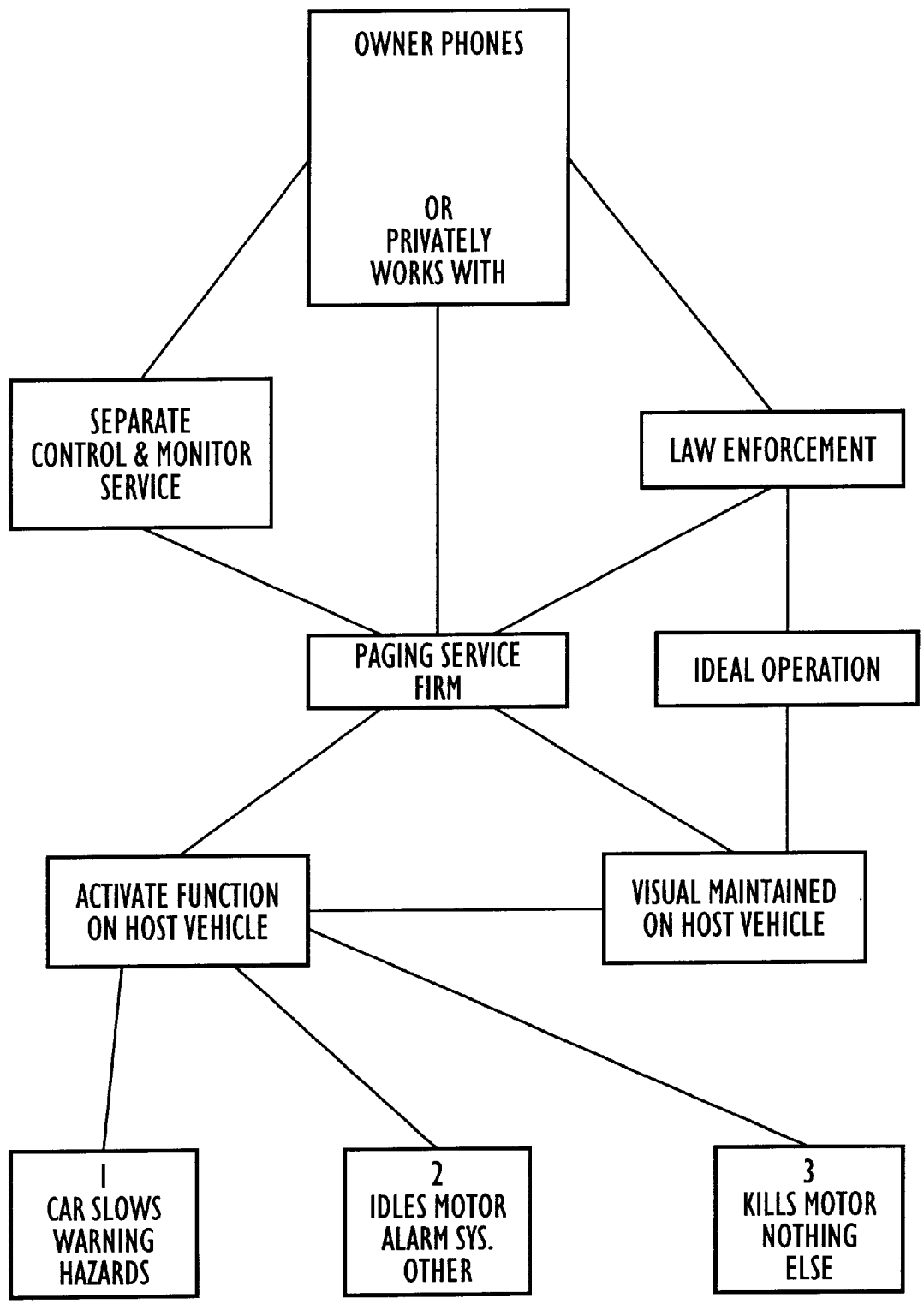
FIG. 9 is an illustration of an important vehicle application for real-time recovery of vehicle that has been stolen.

FIG. 9 is an illustration of an important vehicle application for real-time recovery of vehicle that has been stolen, even while the vehicle is in motion or involved in a chase. In addition, this vehicle application can also be used to apprehend a criminal even when the vehicle has not been stolen by a criminal and the purpose of the apprehension is to arrest the vehicle occupants for other reasons.

In FIG. 9, the owner of the vehicle directly telephones the police, control & monitor service or paging service to inform of the stolen vehicle or vehicle that requires this safer deactivation. Alternatively, the owner of the vehicle telephones the police or control & monitor service who in turn determines whether the paging service needs to be informed of the stolen vehicle or vehicle that requires safe deactivation. As a further alternative, the police independently contacts the paging service or separate control & monitor service to deactivate a vehicle, either because it is stolen or because the occupants of the vehicle need be apprehended for reasons other than stealing the vehicle. Note: As the invention evolves the popper authorities will be able to gain access and remotely control a vehicle in a number of ways such as are provided for throughout the invention described herein.

A page request is then activated in accordance with one of the above alternatives. Advantageously, in accordance with this vehicle application, a special or unique process of bringing the vehicle to a safe stop is implemented, thereby preventing the vehicle from causing serious injury to its occupants or others. This process allows the vehicle to be disabled in real-time, even while the vehicle is in motion, in contrast to other vehicle disable features that are generally only activated after it has been determined that the ignition of the vehicle is off, thereby disabling the vehicle after it has been fully stopped and no longer idling.

In this connection, we have discovered that a simple method of transmitting a series of page requests to stop a vehicle in real-time may be effectively used to bring the vehicle to a safe stop, while at the same time, be used by, for example, a police officer while in hot pursuit of the vehicle for whatever reason.

This multi-staged process of deactivating a vehicle in real-time operates in the following manner: The paging service, upon receiving the page request can optionally verify that the page initiator has the vehicle in visual sight to further ensure that the area is clear to deactivate the vehicle. For example, even in accordance with the present invention where the system safely brings the vehicle to a stop, there may be situations where bringing a vehicle to a stop might be dangerous, for example, on a highway or in a very populated area where the occupants of the vehicle would attempt an escape, and perhaps take hostages.

Next, the paging system transmits an initial page request that, for example, activates a fuel valve in the vehicle and provides a limited amount of fuel to only permit the vehicle to operate at a maximum speed, for example 40 miles per hour (mph). At this point in time, the hazard lights of the vehicle may also be used to warn other vehicles in the area that this vehicle is functioning under a slower speed limit.

Figure 10:
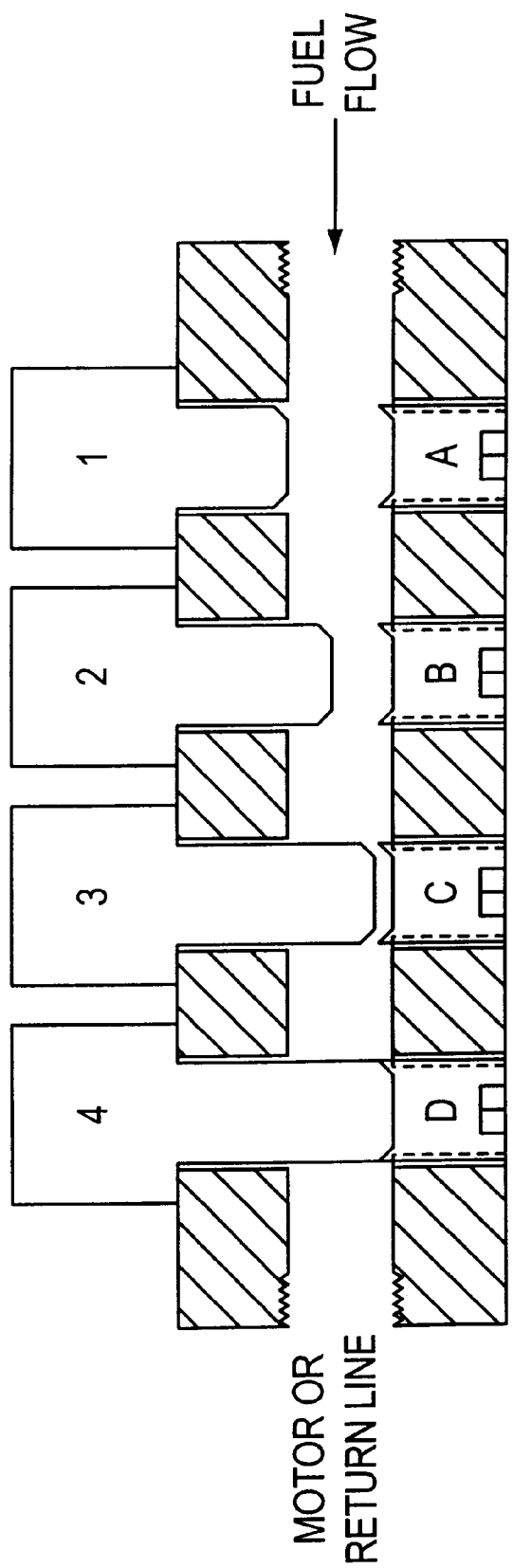
FIG. 10 depicts a progressive shut down valve system.

FIG. 10 depicts a progressive shut down valve system in a cut away view which has an adjustable constriction for either a fuel, or a gaseous, or a hydraulic supply to either a power plant that controls the speed of a vehicle by interrupting this supply thereby restricting the rpms of an internal combustion engine or for hydraulic and/or air driven functions on a mobile or stationary piece of equipment it has been placed on. It is understood that this mechanism may have further applications than its uses in this patent description: such as; auto governor systems or programmable throttle and speed controls or anywhere it might be necessary to have flow control over a substance either liquid, gaseous, or solid. It is further understood the construction and materials of this controllable progressive valve constriction would be determined by the substance controlled and it's application. And also understood is that this includes any automated or artificial intelligence that can activate any mechanical or pre-existing electrical flow control devices for the purposes stated here in this patent as has been described.

This drawing shows a series of 4 separate solenoid plungers that could be activated in a 1-2-3-4 series-like progression to complete this controlled shut down of a power plant. However, the drawing is also being used to display a progressive constriction of flow by the position in depth of the plunger/gate into the flow galley or passage way, and it should also be understood that one solenoid valve or gate with multiple depth settings could accomplish this same result. In this case, the drawing would represent a linear illustration of a single valve depth positions in this progressive process to completely deny, or divert any flow.

Part 1 and part A depict the open setting and uninterrupted flow supply to the power plant in the normal function. Part 2 and part B illustrates the flow volume first level of restriction either of fuel and/or air to the engine which controls the rpms or car speeds to 40 mph). Part 3 and part C shows the engine idle only setting where only enough flow of fuel and/or air is available to sustain the power for the crucial control functions like power steering or braking, but no capability to power up a speed increase. Part 4 and part D illustrate the complete shut down mode, which would be the complete starvation or cessation of fuel and/or air in the case of a machine/vehicle that relied on an internal combustion engine. This would of course result in complete shut down of the power plant and render the vehicle completely inoperable.

It should be noted with this invention and material/energy flow restriction system that this progression of events could be altered and augmented by the proper authorities as the advent of smart cars and interactive highway systems make controlling the steering and braking of a specific vehicle from a remote location, a reality worthy of the risks and liabilities to be managed by such a decision. A through D in this drawing are shown as mechanically adjustable seats in threaded holes to be able to fine tune the volume desired to achieve the levels for the specifically stated functions above. However, it should be understood that any adjustable seating or sized orifice either on the case boss or plunger or any gate design all fall within the nature and scope of this patent. And it would be a normal evolution of this device to control a work function by decreasing or increasing the energy source through controlling the physical flow of that energy source as is done presently in real-time by manual operation; however, when it is performed by automation such as an artificial intelligence and/or remote control devices that can activate electrical solenoids or servo motors/components of restriction devices for the purposes stated herein it falls with in the nature and scope of this invention.

This electrically controlled sequenced valve displayed in FIG. 10 of this patent should be considered unique in and of itself in that it will have far more applications than have been previously mentioned. One such application will be used as a hydraulic lock out to restrict specific levels of hydraulic functions on equipment as prescribed by the rightful owner of that piece of equipment, either remotely or preprogrammed. This entire valve unit will be enclosed or encased in an impregnable encasement connected protectively to the stop box control unit in keeping with the nature and purpose of this invention. This will be accomplished optionally with impregnable cables and the same kind of encasements used for the impregnable stop box if not housed jointly.

Note: Even though specifics have been stated for the pager encasements, this should not restrict this use of the word impregnable as it refers to any optimal protective containment or varied configuration for the purpose to ensure the safest and/or most marketable form of this idea or concept which is to protect and secure these security control circuits and devices with respect to the nature scope and claims of this patent. With a diesel or present day pressurized fuel injection systems, these valves optionally could control the rack pressure by dumping the fuel back to the tank through the return line creating lesser regulated system pressures and/or volume thus starving the power plant by degrees of its energy source.

Alternatively, instead of activating and closing a fuel valve to slow the vehicle, the page request may activate, for example, a cruise control device that automatically places or transitions the vehicle to a particular predetermined speed. The cruise control can be modified in a standard manner to prevent override in this situation. Other types of devices that may be used to bring the vehicle to a controllable or safe speed are also considered within the scope of the invention.

Next, if the vehicle driver does not voluntarily bring the vehicle to a stop, a second page request may be initiated that brings the automobile to a slower speed or even a stop, while leaving the engine to idle. At this point in time, other alarm system devices (e.g., alarm, flashing headlights, and the like) may be used to audibly/visually inform people to stay away from the vehicle because it might pose a dangerous situation, while simultaneously attracting law enforcement personnel to recover the vehicle and/or apprehend the individuals that have just been operating the vehicle.

Finally, in the last stage of disabling the vehicle, a final page request then kills the engine completely for final recovery. Of course, other multiple stage vehicle disable/recovery processes are considered within the scope of the present invention, particularly when such multi-stage processes are designed to ensure safety in disabling the vehicle in real-time.

Figure 10A:
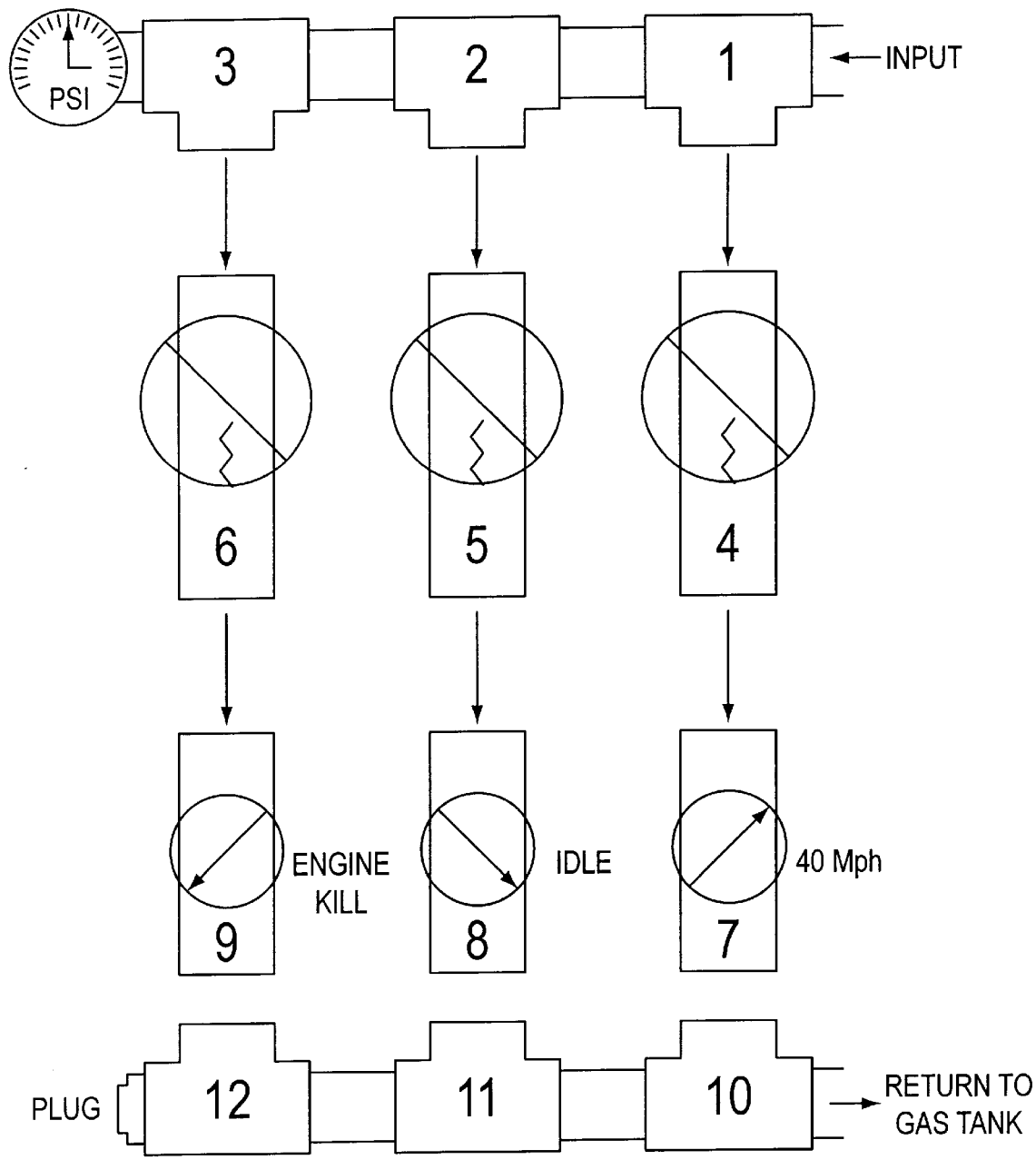
FIG. 10A depicts a progressive shut down valve system in accordance with another embodiment.

FIG. 10A depicts a progressive shut down valve system in accordance with another embodiment. The valve assembly in the present invention is a unique COTS development able to perform the same tasks of the much simpler and smaller fuel valve planned for in FIG. 10. This assembly of parts in an of itself is unique in its design and function. The final device will be in a protected enclosure and about a quarter of the size. But this COTS unit is also being used to display an easy to understand exploded view of how the valve system operates.

Part list for this COTS test unit are as follows:

6 brass ⅛ inch tees 10 brass ⅛ inch nipples ½ inch long 2 brass ⅛ inch plugs 3 brass ⅛ inch needle valves (fine adjustments & set locks)

3 brass ⅛ inch male pipe to #4 hydraulic male fittings 3 brass coated steel #4 female hydraulic to ¼ inch pipe 3 bronze ¼ female—¼ male lp safety shut off valves The plumbing and location to the fuel valve will be determined by the individual host vehicle application. This system could either restrict by degree the fuel completely from the power plant (e.g., optionally carburetors and TBI systems) or be used to create a metered dump of the fuel system. It is the dump method I have chosen for injected cars.

The way these fuel systems work is to have a fuel pump running on key ignition in the tank which supplies a pressure regulated fuel rail that delivers fuel to the injectors. This unique valve will intake fuel from in front of the regulator and simply bleed this fuel off and send it back to the tank via the return tube after any regulator valve. This metered bleeding will be something less than normal rack pressure to somewhere possibly intermittent above psi/vol in the first two settings and then the final valve setting dumps all the necessary fuel pressure to stop or fail the injectors and complete an engine shut down. (The inventor is attempting to achieve this without any kind of equalizing bladder, or any kind of inert gas compensated accumulator system, or additional pressure regulators, bypasses, or any air throttling or timing changes to the spark adjustment from the engine module unit or on board cpu's, although these variations are also within the scope of the present invention or regulations with a small adjustable bypass valve.

With the pump being forced into continual-service with the metered dump enough even pressure can be maintained as the volume wanes to accommodate a smooth controlled restricted supply of fuel pressure to fulfill injector activation and to deactivation to create an even slow down to shut off of the power unit regardless of the air throttle position. Because of the diversity of vehicles on the market today, there may be a requirement to supply many different technical accommodations to adapt to there needs.

There are three sets of two valves that control fuel flow from the input manifold parts numbered 1-2-3 to the output manifold Numbered 12-11-10, optionally with a bypass. (Each set of valves comprise a series assembly of one electric lock off (I/O function only) numbered 4-5-6 (solenoid valves, diaphragm, servo motors, and the like) and one brass needle valve for volume control) numbered 7-8-9. The first set of two valves numbered 4 and 7 are adjusted to dump or block fuel to retain the cars maximum speed to 40 mph. The second set of valves numbered 5 and 8 is set to reduce available fuel to only support an idle setting and not allow for any acceleration. And the final call will open the third set of valves numbered 6 and 9 which kills the vehicle by the complete dumping of the fuel to the tank and eliminating injector pressure and or fuel availability. It is possible that either a separate or the same valve with an isolated function could simply completely starve the engine of fuel by blocking its path to the fuel supply rail and the injectors.

Note on the battery peg system, instead of using a small solenoid to cycle the pager for new incoming pages, a standard mini computer will open and close a small relay switch that cuts the + power off and then on, to the peg, after each received activation, which completely clears the pager for the new incoming page. The mini computer is generally inexpensive and allows flexibility. Stamp computers series I or II are suitable. However, any standard computer will do.

The second embodiments optical message retrieval system may be accomplished through a CCD image sensing device that develops a unique electrical signal when exposed to the illuminated LCD of the pager that has been activated with a numerical message from a phone page. This unique identified electrical signal is picked up by a probe-scope and stored in a computer file of the probe scope's software in a standard PC. The signal is then burned in to a mini programmable computer's input pins as I/O latch triggers. And of course the mini (e.g., stamp computer) is programmed to communicate digitally directly to the cpu of the vehicle and/or turn on or off either digitally (if more convenient) or through low analog current control high current control circuits through either solid state ic's-silicon relays-thrysters and or relays for any desired additional devices or accessories on the host piece of equipment. These final specific current control systems will be determined by the host piece of equipment and any other equipment to be controlled though the pager functions.

Optical devices that may be used in the present invention including: Pixel CCD Image sensor, Active pixel Image Sensor, Small-Format CCD image sensors, Pixel linear arrays, Integrated Optical Sensor, Linear Sensor Array also any support circuits and or specialized light sources (infrared, UV light, regular light and or laser light), strobing technology employed in bar code scanning, to read the data and recognize the numbers and then decode the numbers and via digital binary languages. Alternatively, the present invention does not require transcribing the electrical signal into numerical data then encode it and decode it into a binary signal to create a latch for our input pins on our computer. Rather, the desired signal with a probe scope or a similar technology may be used to obtain the signal and burn this unique signal received from our optical unit into our input pins as a latch untranscribed from a file stored in a P.C.

Advantageously, the mini computer may be programmed from a P.C. and drive these optical devices through the mini computer without much additional circuitry. So this will be a great evolutionary advantage to hardware adaptability.

Figure 11:
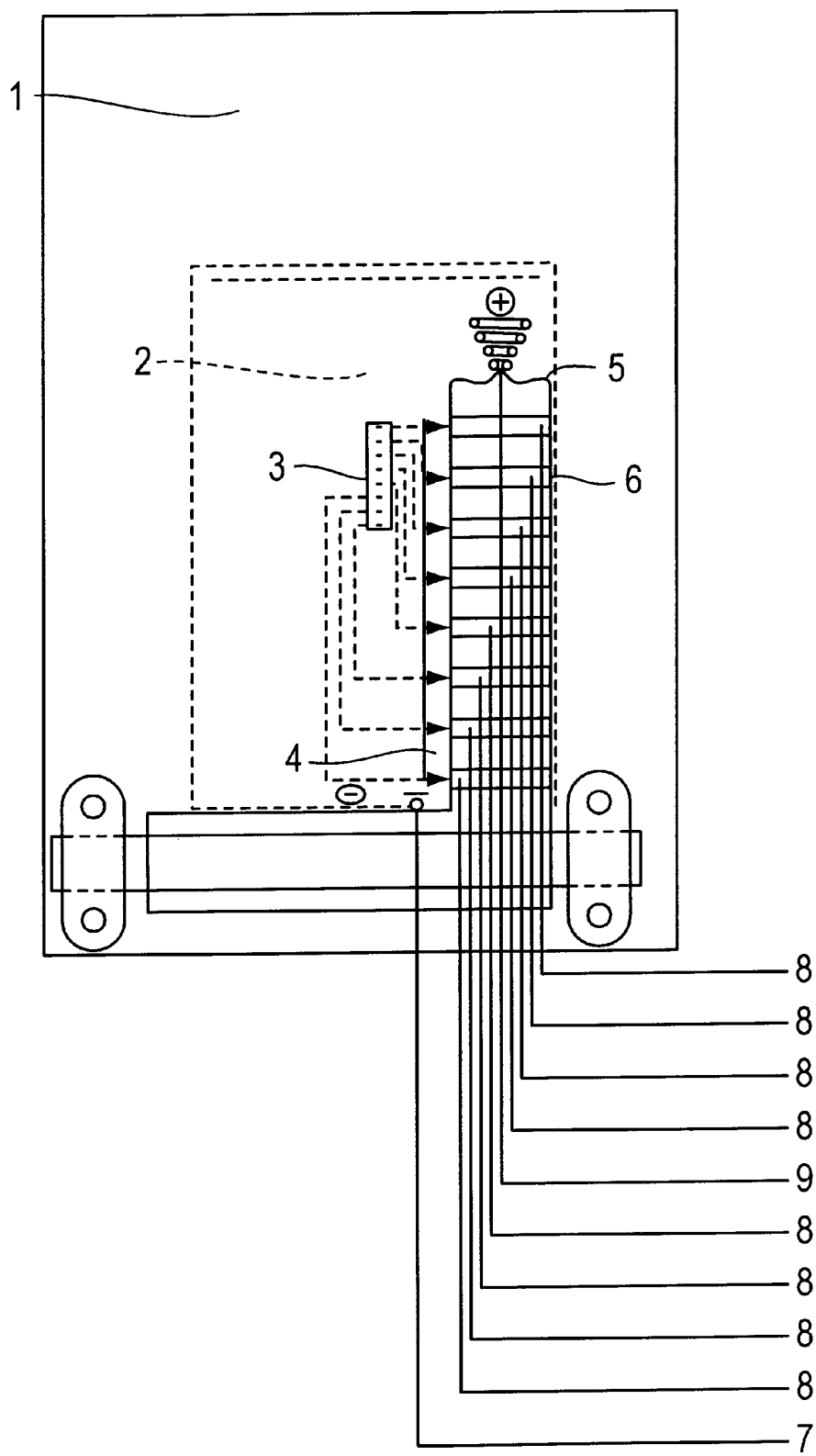
FIG. 11 illustrates the battery peg or power peg multipin connector.

FIG. 11 illustrates the battery peg or power peg multipin connector. It is the purpose of this device part to supply unlimited and/or rechargeable operating current to the pager unit while accessing the functions of the pager through a simple to install contact bracket brush system that is easily installed into the pager and mates with the "power peg's" contact strip rings in the invention's lockup box. The switching on and off of the power peg will clear the pager.

It should be understood even though this connector system is depicted as a swivel round peg or post (and shaped like a AA battery) in FIG. 11 that any configuration of a multi-contact connector with the concept of using the battery compartment/or connection area to either supply current and/or gain electrical access to any battery powered device and/or machine's other functions fall with in the nature and scope of this part device even if it is used for other purposes. The first part is not a specific depiction of any secure containment design and is only shown to illustrate the fact that part No. 2, the pager, optimally should be secured in a secure lock up as has been depicted in earlier drawings.

In FIG. 11, part 3 depicts the connector that already exists in the standard pager and connects the receiving section to the micro-processor section (basically). It is at this factory connection that an 8 segmented ribbon with a positioning or jigged fitting terminal will guide the puncture of the individual ribbon segments by the contact pins of this junction there by accessing the data stream and functions of the pager. The other end of the ribbon would be connected to individual bush terminal contacts as depicted by part 4 in the illustration. These brushes or palls located on the side of the battery compartment would make contact with corresponding segments of isolated contact rings or brush plates on part No. 5 (the peg).

The rings part No. 6 in FIG. 11 are individually wired and then connect to the control section and processor function in the secure lock up for decoding, transcribing, interfacing and/or producing/initiating any command or operating current necessary to affect a given desired response through any coupling of on board devices/machines and/or equipment on the host vehicle/machine. Part No. 7 shows where the contact pall is for the negative battery service from the lock box battery source. And number 9 indicate the wire or line that runs up the center of the peg to a contact pall that strikes the spring in the pager which is responsible for the positive 1.5 vdc to operate the pager. This power supply is taped off of one of the 8 rechargeable batteries in series housed in the lock up. (Battery size to be determined by unit's demand). The parts and lines marked No. 8 are the pager's circuit and data access gathered by this power peg system and connected to the control systems inside the lock up to be processed as determined by the unit's design and the host equipment needs for any of the desired functions previously described.

NOTE: FIG. 6 depicts the other hardwire system to access the 29 pin ribbon running to the lcd display and decoding the segmented numerical output to retrieve the digital data. It should be understood that these 29 pin connections and any combination of these two connector concepts (FIG. 6 and FIG. 11) or any future factory alteration to the pager which access these pager functions fall within the nature and scope of this patent.

Figure 12:
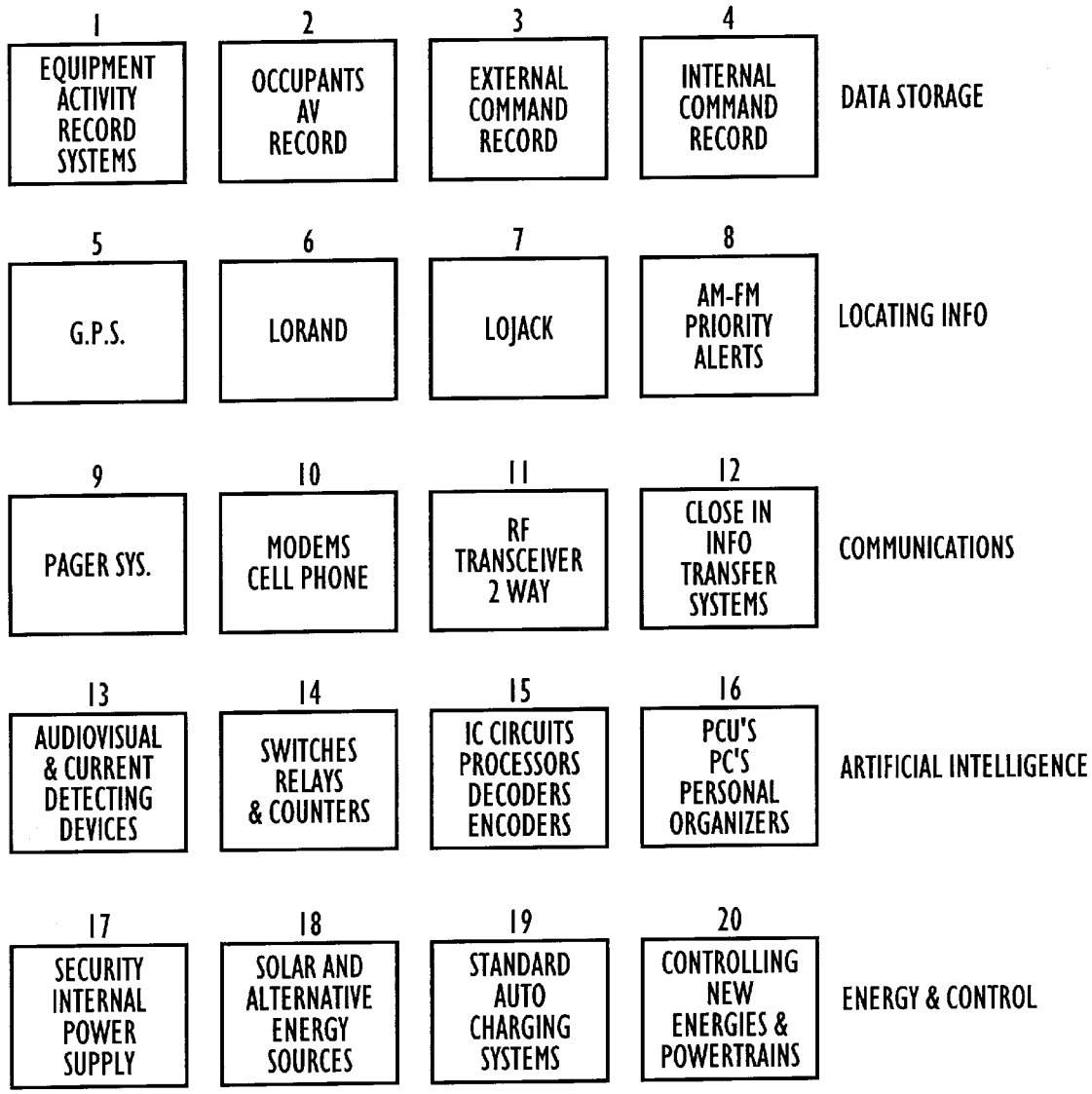
FIG. 12 is an outline of a containment and a series of blocks.

In FIG. 12, there is an outline of a containment and a series of blocks inside representing the devices and circuits that would benefit by this type of containment to fulfill the purpose of this patent for the present and the future. And more specifically as it pertains to technical security, financial accountability and public safety with regards to these circuits, devices, machines and the equipment they are attached to. This drawing does not represent any specific configuration as this would be determined by the types and variety of equipment being utilized to fulfill any specific purpose and those individual specifications and needs.

The first row in FIG. 12 illustrates the data storage capabilities needed to complete the stop and control boxes function to serve as a black box. In the drawing, the No. 1 block is a recording device/function that can record the last 15 minutes or as long as possible of operating time of pertinent mechanical functions in the most accurate economic and technical manner available. There will also of course be any continual record deemed necessary by law preserved in this record system, e.g., separate odometer reading. The No. 2 block is any recording function/mechanism in the cab of the vehicle or operator section of a piece of equipment that will give either audio and/or visual documentation to the activities of the driver specific and/or occupants for the same time frames at least as have been described for the block No. 1 recording times. This record will also have any data that can be obtained on the driver and occupants as to the physical condition, e.g., breathelizer devices, pulse rates, blood pressures and fingerprint identifications or any other data gathered by other on board devices that could be deemed relevant in understanding an equipment/operator related altercation.

Either in block No. 1 or No. 2 in FIG. 12, and any on board video or new computer chip cameras record of any external data would also be retained as to the time relevant events they capture. Block 3 is a recorded function and/or device that is responsible for retaining any external communications received from outside the host vehicle and any recorded response to that imput. Block 4 represent the internal response record that shows all driver initiated actions of the vehicle. All of these blocked out recording sections will have records that can be displayed in accurate comparable matched time increments with all the recorded data.

The second row in FIG. 12 holds the locating functions and the local alert system for standard traffic advisories and/or a connector for land lines like those used in a standard phone computer and electronic service. The No. 5 block is for the global positioning system that can either aid the driver while operating the vehicle or transmit its information through the communication devices as determined by any controlling circuits on board to give other systems an accurate location of the vehicle. The 6th block is another locating system as well is the 7th block. It is safe to say that one of these three would probably be used, however, any or all these systems could be employed as might be determined by any specific application.

The No. 8 block in FIG. 12 is depicted as a AM-FM receiver for traffic alerts which is present today through normal car radios. These traffic information messages would be stored as a permanent record and relayed to the driver in real-time through the invention. This receiver area as well as the communication rack of blocks would ultimately carry the responsibility to dialogue or interface with any interactive highway system and or any community or commercial service that's purpose is to locate, monitor and control equipment and or locate individuals outfitted with a small limited distance transmitter that is easy to conceal and then rely on the machines and equipment with the power and this invention to receive this dedicated limited signal then call a monitoring service with a priority preprogrammed alert. Accompanying this alert would also be an accurate location of the receiving vehicle. In this situation there would most likely be a radius of responding vehicles which by computer map tracking would focus a search quickly. (This would decrease tracking time with this special transceiver on missing children.) Ideally these signal alert systems would focus on stationary vehicles triggered by the small transceiver that is activated when the child becomes at risk.

The false use or tampering with these systems in FIG. 12 would be made illegal and carry stiff sentences. This system should be treated with the respect that the 911 system gets today. And the activation and use of these systems should be free of any toll or charge as they rely on the electronic ears of the public's personal property and will be part of any basic service mandated by law.

The third row in FIG. 12 is the communication section and once again these devices can either be substituted for one another or used in conjunction with each other as would be determined by the design and the needs of the stop and control boxes purpose. The no. 9 block illustrates the original and present day design of this invention. An inexpensive remote control capability with the standard pager (C.O.T.S.). This of course could be merely circuits rather than the C.O.T.S. device depicted in the previous drawings. This is also true for the cell phone technologies, e.g., also (modems and digital systems) and any standard RF transceivers or two-way radios as depicted in Blocks numbered 10 and 11. They too could be in circuit form and not necessarily a C.O.T.S. application. (This invention recognizes the advantages of both applications that of a complete independent device interface into a network control center, or the complete unit being designed as an integrated set of circuits in the host vehicle's electrical system).

The No. 12 in FIG. 12 block close in information transfer system is another new concept. This security info transfer system could allow the proper personnel to access and control all the necessary functions through either light transmission infrared, low noise highly specific RF signal, etc., or microwave devices when in close physical contact with a subject vehicle. All vehicles will have receiving devices or targets that will retrieve this access request message. They will then be able to have an interactive dialogue with an outlaw vehicle and take control of its complete functions with certified security override IDs in addition to the device itself. These of course would be authenticated through interactive highway computers or manufacture data terminals or the many other commercial companies offering these services that could communicate with the subject vehicle in a moments notice.

The fourth row in FIG. 12 is the control circuits processors, programmable controllers, and computers all the way up to an artificial intelligence that can make the vehicle be totally interactive with the environment and literally drive itself. It is also the area that could store P.C.s and organizers that would allow the driver to do computer work with secured modem hook ups to allow the driver and occupants to merely carry a storage disk and work on any P.C. anywhere. With the advent of these controlling circuits and interactive highway systems, the driver is going to have a great deal of more time to work in the vehicle. And it will be more necessary and possible than ever to increase the security of these expensive devices both technically and by stringent antitamper laws due to the social economic value of these containments (e.g., The Black Box and The Billing Box).

The 13th, 14th and 15th blocks in FIG. 12 illustrate the technologies and circuits that would be used in creating the first two device embodiments already described in this patent. The 16th block does not only refer to programmable controllers and computers on board by the manufacture but also the use of personal computers and personal organizers as well as data transfer systems that would benefit by being linked to all the other circuits and devices in this secure system protected by specific laws. It is obvious that with the automated controls for our future vehicles that the driver and occupants will enjoy more time to use these devices during commutes and long travel. Also this block would have a printing device to work with any interactive highway system to automatically ticket driver error, issue equipment, environmental, safety warnings, and statements of vehicle legal violations with as much data that is available to the system at the time. This written statement would also be stored in any onboard recording device and transmitted to the popper authorities. For this purpose a single burn CD is a possibility.

The 5th row in FIG. 12 is the varied power supply options and power control section. The No. 17 block indicates a place for the self contained emergency power system secured in such away as to deliver an adequate current to operate all vital functions and the out reach devices in the event of a failure to the host equipments electrical system. This has been described in more detail in other sections of this invention but will vary with application. The 18th block is for any control circuits needed to regulate any other on board electrical generating systems, be it solar, fuel cells, and what ever designed circuits necessary to tap this power source to recharge or drive this inventions electrical systems. This section also would apply to any electric vehicles or equipment that were recharged or energized by external sources and or standard utilities. No. 19 applies to all the standard automotive type charging systems and the already stated ability to access these power systems to insure a constant charge to the invention while the host equipment is operating or in an authorized public response mode.

Figure 13:
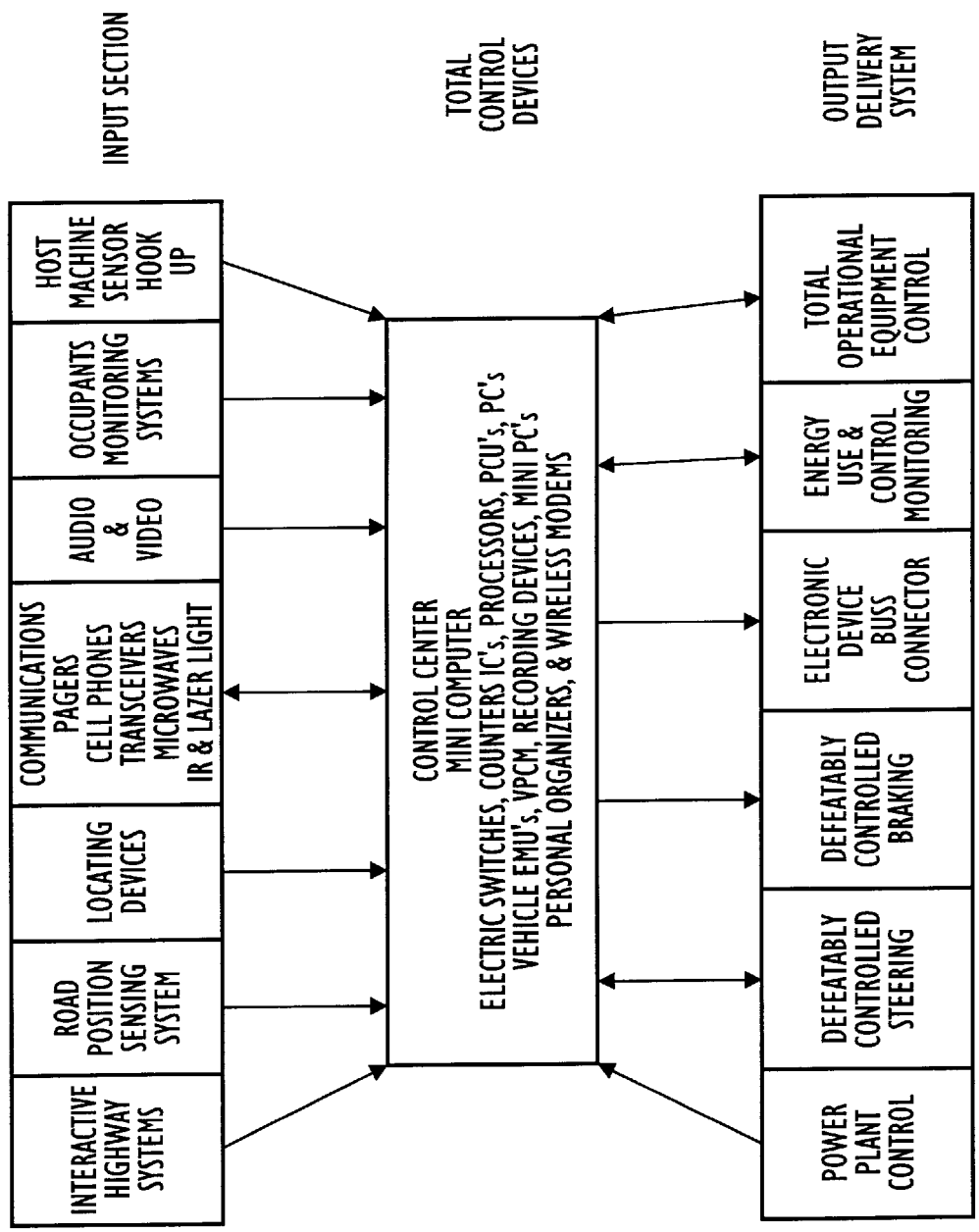
FIG. 13 shows the stop and control box used with smart cars and/or interactive highway systems.

FIG. 13 shows the stop and control box used with smart cars and/or interactive highway systems to control and monitor the future automatic activities that will require more secure and legally accountable control systems coupled to the most advanced sensors, recording devices, and telecommunication systems as described in this patent. This drawing shows generally some of the interfaced pathways of the specific devices and the out reach equipment on the host vehicle.

Once again this drawing, FIG. 13, is not intended to display any required specific circuitry as has been done for the first two device embodiments which have been completely explained. This has been done specifically because of the great diversity and quantity of different circuits and devices available on the market today. It is the intention of FIGS. 12–13 to make clear that all these devices will have to be interfaced inevitably in the near future and that the proper securement and legal protection of such a system for these devices will be a social, commercial and legal necessity.

The manufactures of all these components and host vehicles will come to realize this kind of protection and record keeping will be crucial for their legal defense to discriminate between the separate manufacturer's liability for product failure and the public's mis-use (e.g., dated driver notice of a recall notification or safety warning e-mailed to the vehicle for which the driver must acknowledge receipt of, also as an analytical tool to any equipment mishap or altercation).

However, a significant advantage of this invention's legally protected secure control system is an area for all these manufactures to consolidate their many duplicated electronic hardware circuits into a complete interactive control/monitoring center which will allow all to reduce their cost for this purpose. And it is all of these devices/functions either interfaced and/or are combined electronically controlled and protected legally and physically no matter what form they are configured in that this invention depicts as unique in the block and flow chart drawings labeled FIGS. 12 and 13.

It should be further understood that if manufacturing and industry arrives at a point where they see the value of this combining concept and public policy has not yet developed the legal structure to recognize this combining concept that this invention still holds the uniqueness of this kind of combined protected system of the devices displayed and described here in this invention.

FIG. 13 shows a basic component design and/or flow chart for one possible combined secure and accountable control system and its deployment. The first bar of blocks is the input section, which basically is somewhat self-explanatory by their labels. First the interactive Highway system is an advancement with as many variations as there are designers today. Some use video cameras, some use magnetic devices some use transmission devices with all types of emf's and are processed though all types of programmable controllers and computers, as they come on line, they are going to have different requirements to function.

This invention's consolidated approach to assimilating data input will serve to universalize and coordinate their experimental differences and weed out their weaknesses from performance records while allowing for inexpensive augmentation, through future modular hardware changes or simple reprogramming of software. And all in one legally controlled and dedicated system. The second block, the road position sensor system, will either be a part of the interactive highway system and/or a separate set of devices that can be made of various technologies (referred to earlier) detect physical changes in the surface of road and simultaneously be receiving other imput data (gathered by similar devices as to it's geographic and physical relationship with other vehicles and stationary objects.

The locating device section refers to the GPS, Lorands, Lojack (or any private owned and operated tracking device and/or monitoring system). And the next two blocks COMMUNICATIONS and AUDIOVISUAL all feed their geographic data and travel alerts to the control center to be used to correlate the positions and conditions of the vehicle to its environment and advise the operator and/or control the vehicle if this need arises and this capability is deemed legal and/or necessary. The occupant monitoring systems will be composed of all kinds of devices. And once again many exist and are on the market today. The difference is that in these devices, data especially for the operator, can be monitored in real-time and recorded continuously while functioning with the driver alert and warning system in the invention. Finally in the input section is THE HOST MACHINE SENSOR HOOK UP this is the vehicle telemetry data of the equipments operations. This is also forwarded to the control center to be recorded evaluated and coordinated with any other device and software deemed essential to this combining concept to secure this information for efficient accurate integrity checks, and/or analysis, for either onboard or remote control and monitoring.

Note: Many manufactures today have in their controller modules to perform this monitoring process for the operational needs of their equipment based on predetermined programs for proper functioning, such as a fuel injection controller. In this case, this invention would further their usefulness and increase their value and use by all the devices and functions with in the inventions control. Note: In the future, it could be possible that this area would be responsible for the monitoring devices necessary to report back to the control center on the functions and operation of the new energy related devices and power train systems.

The middle block in FIG. 13 is the Control Center. All imput data would be processed in this area by whatever type of control devices were deemed necessary. This would be any of the programmable controllers processors, microprocessor, decoders encoders computer systems, from the simplest to the most sophisticated, and any accompanying software and connections to complete the interface and combine this information and hardware for compatibility purposes from the imput side and deliver the appropriate electrical signal to the intended out reach device on the host piece of equipment and record this process.

The third bar in the bottom of FIG. 13 is a segmented way the system could service the outreach devices that might be on a host piece of equipment. Once again there is no doubt that the variations and overlapping of all these devices and industries being merged in this one secure control center will have many different configurations so this drawing is not meant to restrict by depiction this inventions unique unified control and record qualities and properties.

The power plant control block in the last section of FIG. 13 would of course in keeping with the nature and purpose of the entire invention be able to control the speed from the control center and shut it down in a controlled remote fashion. It would of course be able to adjust, augment and do anything the manufacturer's electrical system was designed to affect as well as be directed to make these changes by any of the other on board equipment that has been interfaced into the system, THE DEFEATABLY CONTROLLED STEERING and THE DEFEATABLY CONTROLLED BRAKING would of course have their primary function linked to any emergency remote control need, but would also function as an output adjustment function to the imput data from the interactive highway system and other processed communications. The ELECTRONIC DEVICE BUSS CONNECTOR is just many varied access sections of comports for the varied industry specific connections that might be needed to first interface with or to add on or augment accessories to the system and host piece of equipment. ENERGY USE AND CONTROL will first be as simple as controlling the sequential valve that will shut down the fuel supply on vehicles today as per the first and second device embodiments and evolve to other control and monitoring devices applicable to the nature of the energy being utilized. The final block THE TOTAL OPERATIONAL EQUIPMENT CONTROL is the host piece of equipment's standard electrical delivery system with all its circuits and accessories.

This invention restricts or alters a number of uses or operating functions of a piece of equipment/machinery, which are necessary for this same piece of equipment to be used effectively, or at all. This is accomplished with a standard commercial pager (C.O.T.S.) either local, national or worldwide already available on the market today installed, for example, in the on position, in the invention (The Stop And Control Box), on the owner's equipment. The invention can either use the pager's clock and alarm function or a phone page signal received from a commercial paging company either by altering the pager slightly with connectors to access it's circuits in one variation of this invention (¼" jack or battery peg system) or not altering the pager at all and only using sensing mechanisms in the invention, that sense the pager's functions and messages, which in turn, activate predesignated functions, e.g., shut down systems on the host equipment, at the owners request. The clock and alarm function allow the owner to predetermine the time at which the machine is to be deactivated either entirely or in part, and/or the phone page activation allows a direct command to limit these machine functions or terminate its use entirely.

The present invention also includes various shut down mechanisms for varied machine applications that are designed specifically to work in conjunction with the Stop Box of the invention. They include the varied (Fuel lock off) which by counting consecutive pages or predetermined coded messages, incremental restricts the fuel flow amounts to the power plant on the host piece of equipment, first to govern its R.P.M.'S and finally to shut the equipment off entirely. Next, the air flow restricted valve which functions in a similar fashion except it restricts the power plants available air. Both of these mechanisms are for Internal combustion engines however, they could have other applications. The switching relay system, to disengage motor start, relays on electrically energized equipment. Fluid lock outs are provided to restrict fluid flow to hydraulic functions. And it is understood that all these devices could have other applications. The invention can also be connected to, and made to activate, many standard shut down systems and other functions that are on the market today either by original manufacturers or after market suppliers.

The first and second device embodiments do not generally require an R.F. receiver in and of itself that controls the host piece of equipment, but rather an interface mechanism that couples the standard commercial pager in its varied configurations, which are ready available today and employs it as a stimulating device for this invention (The Stop And Control Box). Which in turn, through the first and second device embodiments, can direct the host machine functions in a general way as is described in the first embodiment by counting activations, or more specifically, by reading only up to a six digit display on the LCD of the pager and directing the machine with preprogrammed responses that correspond to the numerical data imput. With the varied designs and styles of beepers and pagers available today and in the future, the invention's configuration would change or is changeable to meet the needs of the individual style of pager being used. However, all the same parts and materials used and described herein may be used. This invention with its first and second device embodiments allows for more uses of the standard beeper or pager than just a notification device.

This invention further provides the secure lock up and concealment concept; plus any shielding for the many varied control systems, sensors, microprocessors, wiring, mechanical linkages, or any on board personal computers (P.C.) of the future linked through telecommunication devices, scanners, readers, camera's (video, etc.) or new video computer chip cameras, optical linear arrays, character recognition systems, couplers, connections, pager's, beeper's, any other telecommunication equipment i.e., cellphones, rf receiver's transceivers or transmission devices either used to remotely control or act in concert with any type of locating devices i.e., GPS.Lorands, lojack, etc.; also, any recorders and or recording devices, i.e., magnetic tape, CD's, Integrated circuitry or micro chips, that can preserve (store on board) and or report back data and information (either in real-time or at a later date on how the host piece of equipment is operating mechanically; and, any and all data that can be gathered on its operator and occupants.

Shielding of hard wiring may also be provided to protect and make impregnable, secure and/or concealed as possible containments for all the internal components and the outreach functions they affect, in order to protect this invention's purpose (which is to restrict the unauthorized use or uses of the host equipment). And to unrestrict the authorized use or uses of said same equipment and/or protect any security functions from any unwarranted tampering.

It is the intention of this invention to secure any and all control systems and their records or data in a fashion suitable to be used by government authorities, and insurance investigators as a means to determine the causes of an automobile altercation for legal uses in much the same way and spirit that black boxes are used today in the air travel industry. It is the belief of this inventor that with the advent of the smart car concept and interactive highway systems of the future; governments and insurance companies will be forced to and seek out a way and therefore legislate laws to protect and monitor these systems and preserve their records for the capability to assign liability, personal accountability, and also gain accurate information on these new technologies and the populous operating them either legally or illegally, so that they can set and enforce well informed public policy as it pertains to these technologies and their safe and lawful operations.

For this reason it is claimed that there might be either sole control over the lock up or even a second level secured area that would be only accessible by the proper authorities as might be prescribed by law. And even only if a monitoring function was employed for this purpose; it would fall within the nature, scope, spirit and intentions of this patent and claim. (To secure and restrict the unauthorized use of a vehicle, with the understanding that public domain supersedes individual ownership if this proves to be constitutional) or within the legal parameters of any sovern government, where it is employed in this manner.

NOTE: The term of secure lockup as it is used in this patent is not just a lock and key in the literal sense but any type of secured containment that is used for this purpose where access is either restricted or denied if only though difficulty or special devices commercially, privately, or by any manufacture design or merely publicly governed by any laws of the present or future for any of the above stated purposes.

The invention provides the right to activate and deactivate any burglar alarm systems (OEM or after market supplier), emergency warning systems (Flashers horns buzzers sirens lights etc.), locating equipment (Lojack G.P.S.), any R.F. transmitting equipment (CBs, 2 way radios, cellphones, etc.) and or any prerecorded voice message equipment, or on board recording devices on the host machine that can be coupled with any transmitting equipment that could communicate the location of the host equipment and or any identifying information as to its real ownership and state of possession, either directly through this invention or coupled to it, or any other systems that can control these functions. This invention activates any recording devices that give specific instructions to the unauthorized occupants or users of the host equipment and or any other mechanical device that can communicate warnings or record conversations of the unauthorized persons for use in their safest apprehension and prosecution. Also this invention provides one or more recording devices activated to analyze the performance of a piece of equipment and its functions for any investigative purpose whether it is physically secured or not or whether it is remotely activated or not. Finally this invention uses the commercial pager (C.O.T.S.) as a stimulating mechanism.

As a logical progression and evolution of this technology, that anyone already having a cell phone or other low noise R.F. transceiver equipment either already on board a piece of equipment/vehicle, or one that is portable would wish to have that piece of expensive equipment do all these functions; so this invention couples or securely contains these devices that allows them to interface and control these functions as have been described herein.

The first system variation of the present invention utilizes any privately owned and operated device embodiments coupled to the standard commercial pager, which could be privately activated by an individual, who has privately bought or leased a pager and the service, and then combines it to this or another system that controls shutdown functions for the exclusive purpose to restrict or unrestrict use or uses of a piece of equipment, machinery; the second variation of the invention further relates to a more sophisticated system, which can shut down a piece of equipment sequentially and in conjunction with the owner's wishes and or law enforcement demands; this system might be privately owned or leased, corporately or commercially owned or leased, and or publicly owned or leased either in any part or whole of these device embodiments, and or in any part or whole for these system applications. Further, the present invention records vehicle and occupant activities in any manner deemed necessary and available and secures this data in any fashion necessary to allow any analytical process to take place as to the proper functioning of man and machine at any given time for any purpose. (This refers to the black box concept described earlier.) This includes any report back capabilities in real-time as well for this same purpose.

Figure 14:
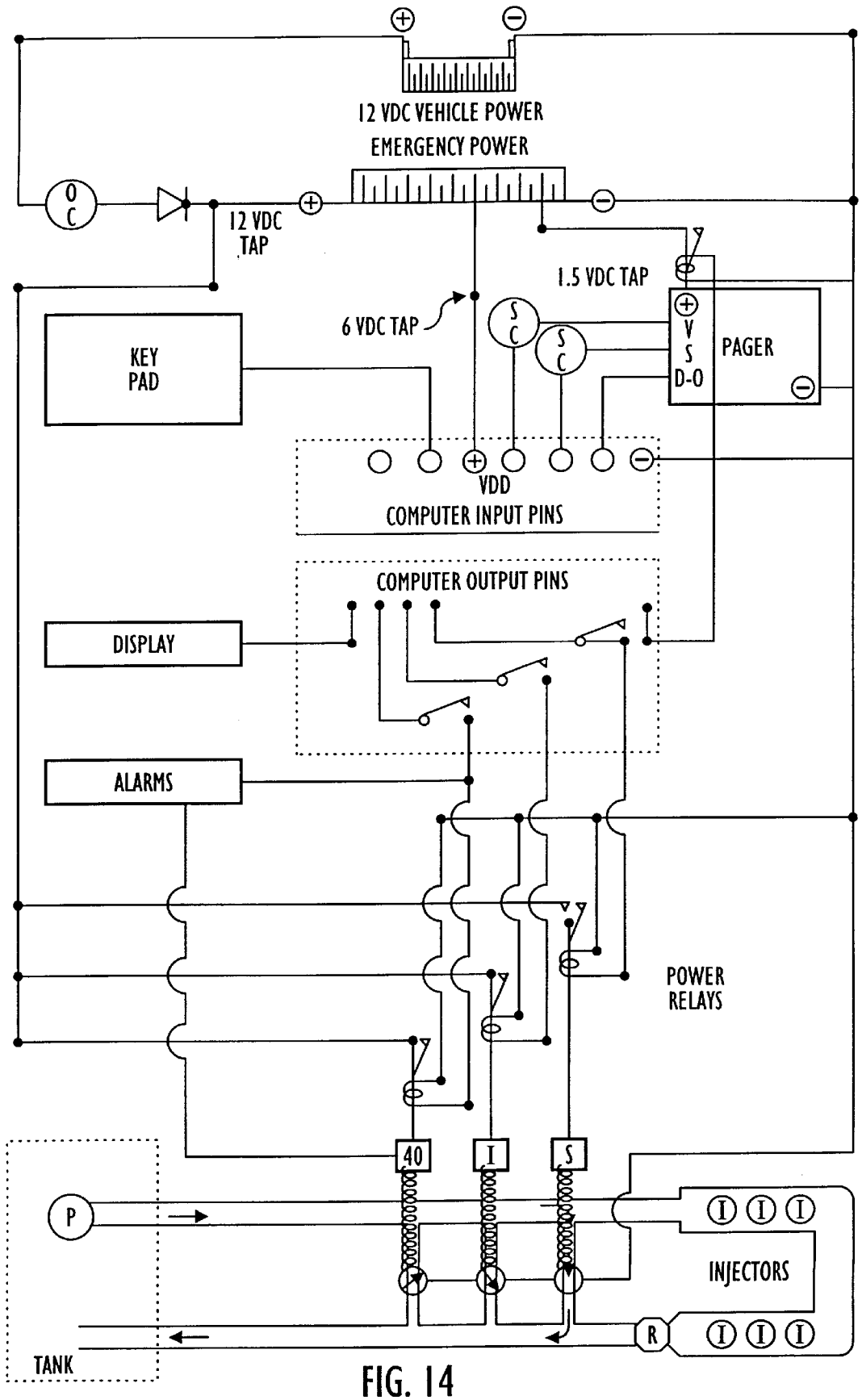
FIG. 14 is a drawing description of the electrical control system for one embodiment of the invention.

FIG. 14 is a drawing description of the electrical control system for one embodiment of the invention. At the top of the page of FIG. 14 the power is taken from the host vehicle power supply and run through a one way diode and over charge sensor system (labeled OC) that only permits current in one direction and retains an optimum charge in the optional rechargeable dry cells. The emergency power supply has three power taps. One at 1.5 vdc another at 6 vdc and the final at 12 vdc. These eight drycells are wired in series and charged in the same way. The first tap isolates one drycell and supplies 1.5 vdc to the pager unit. (It is also possible that the power and switching necessary to clear the pager will be handled, for example, in the mini computer and not through the relay shown in the drawing.) The second tap pulls 6 vdc from four drycells and is used to power up the mini computer and support circuits (labeled SC in the drawing) that might be needed for any of the sensors which are labeled V, O and S (e.g., microphones, photocell and vibration pickup) in the pager box. D in the D-O input is a possible hard wiring as has been displayed in FIG. 1. The O in D-O input is for optional light activated or optical sensor (optionally). The remaining input pin at this time is for the key pad to cancel any and all remote control signals by a special code. The 12 vdc is used to power up the valve system solenoids and all the alarms. Output pins operate driver display and control devices.

Presently this will be accomplished with relays, but it is possible that this will be done using silicon relays or semiconductor devices. The emergency power will be prioritized to service the valve shut down system first and use the host vehicles power to run all the warnings in the event an unauthorized person attempts to compromise power to the valve unless vehicle is in the off position. If this is the case, priority emergency power will disable ignition and drive any energy saving time sequence, location devices and/or on board alarms and warnings. For this same reason, the valve should be housed in the same pager containment on the host vehicle as we go to manufacture, however, the secure containment may not be used in some of the prototypes to allow for total visibility of the device.

FIG. 14 depicts a more advanced secure box with some of the mentioned devices that would benefit by being in a protected enclosure and interfaced together. FIG. 14 may be a constructed generic box that one can fill with COTS, devices or circuits in a modular setting. So these boxes would have all the standard interface connectors used in the communication field, the automotive industry, computer field and radio electronics field to enable any easy way to adapt and connect these devices in a modular fashion. Examples of COTS devices include Uniden's and Ericsson's data products including the Portable Wireless Modem, or the mobile office GC-25 for GSM.

Figure 15:
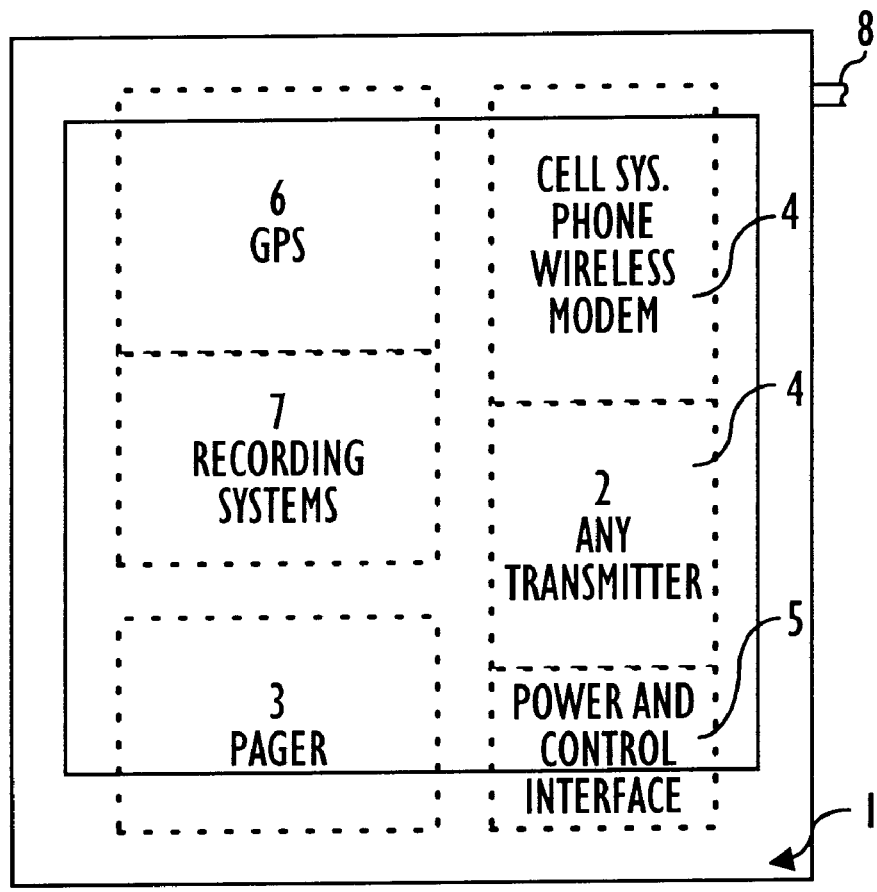
FIG. 15 is an illustration of a system view of another embodiment of the invention comprised of a combination of standard devices that have been programmed or designed to perform the functions described herein.

FIG. 15, part 1 of the encasement, which would be constructed in a similar manner to protect it from tampering and the elements, including fire and shock (impact or electrical). The number 2 area will house any transmitter type devices such as radios, cell phones microwave beacons or any wireless modems or emergency specific cell phones. (These last two inexpensive devices, one of which is already set up for emergency priority service, will be an excellent way to give inexpensive high level report back capability to the invention while keeping reception cost down with the pager.) Area 3 is for the pager. No. 5 is the emergency power and the mini computer or control area housed under these other pieces of equipment and are fully capable electrically to support with power and interface all the connected devices and any dependent outreach functions through previously described connectors.

No. 6 shows a dedicated area for any locating devices as has already been described. And area No. 7 is where any all types of recordkeeping equipment would be housed or hooked up. This area could record machine functions, operator actions and equipment interactions as has been described earlier as well. Once again this illustration is general and not device specific because of the amount and varied pieces of equipment there are on the market today and the cross capability that exists in these separate devices. It is the purpose of this drawing to show that these devices can be stored, secured and interfaced together to achieve a secure and responsive control system that fulfills the nature and scope of this invention. Ideally, a manufacturer of host equipment will also store their control circuits in this container and be legally required to do so as well.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A real-time vehicle recovery system including stop and control box that restricts unauthorized use of a vehicle, comprising:

a pager having a receiver for receiving a page signal request initiated by a user and an output port for outputting an output signal indicative of the page signal request, the page signal request indicating that the vehicle is being used in an unauthorized manner; and a controller responsively connected to said pager, receiving the output signal and, performing a real-time controlled operation while the vehicle is in operation, the real-time controlled operation including at least one of terminating power to the vehicle to bring the vehicle to a stop, terminating fuel to the vehicle to bring the vehicle to a stop, reducing fuel or energy to the vehicle to slow the vehicle down, and selectively at least one of terminating and reducing power to at least one energized system in the vehicle used to at least one of control, propel and drive the vehicle.

2. A real-time vehicle recovery system including stop and control box that restricts unauthorized use of a vehicle according to claim 1, wherein said controller terminates or reduces the energy or the fuel to the vehicle responsive to detected movement of the vehicle.

3. A real-time vehicle recovery system including stop and control box that restricts unauthorized use of a vehicle according to claim 2, wherein the detected movement of the vehicle is determined from at least one of the speedometer, odometer, rotation of one or more wheels, revolutions per minute meter, axle rotation, and vehicle movement.

4. A real-time vehicle recovery system including stop and control box that restricts unauthorized use of a vehicle according to claim 1, wherein said pager is used to stop or control vehicle responsive to receipt of the page signal request initiated by the user by dialing a telephone number.

5. A real-time vehicle recovery system including stop and control box that restricts unauthorized use of a vehicle according to claim 1, wherein said pager is disposed in a security box to prevent at least one of tampering and unauthorized access to said real-time vehicle recovery system.

6. A real-time vehicle recovery system including stop and control box that restricts unauthorized use of a vehicle according to claim 1, wherein the output signal comprises at least one of light, vibration, sound, a display, and an electrical signal with a substantially unique signature.

7. A real-time vehicle recovery system including stop and control box that restricts unauthorized use of a vehicle according to claim 6, wherein said controller further comprises at least one of a light sensor, a vibration sensor, a sound sensor, an optical character recognizer, and an electrical signal recognizer to detect the at least one of light, vibration, sound, a displayed characters, and an electrical signal, respectively.

8. A real-time vehicle recovery system including stop and control box that restricts unauthorized use of a vehicle according to claim 1, wherein said controller includes a memory, and wherein the output signal comprises an electrical signal with a substantially unique signature that is pre-stored in said memory as a reference signature, and when said controller receives the output signal, said controller compares the substantially unique signature with the reference signature to determine whether the user has initiated the page signal request.

9. A real-time vehicle recovery system including stop and control box that restricts unauthorized use of a vehicle according to claim 1, wherein said pager includes a reset function, and wherein said controller resets said pager by initiating the reset functions.

10. A real-time vehicle recovery system including stop and control box that restricts unauthorized use of a vehicle according to claim 1, wherein said pager includes a reset function implemented by activation of a reset mechanism, wherein said real-time vehicle recovery system further includes a plunger triggerable by said controller to activate the reset mechanism and the reset function.

11. A real-time vehicle recovery system including stop and control box that restricts unauthorized use of a vehicle according to claim 1, wherein said pager includes a display and a reset function implemented by activation of a reset mechanism to rest the display, wherein said real-time vehicle recovery system further includes a plunger triggerable by said controller to activate the reset mechanism and the reset function to reset the display.

12. A real-time vehicle recovery system including stop and control box that restricts unauthorized use of a vehicle according to claim 1, wherein the at least one energized system includes at least one of a fuel injector, a carburetor, an ignition, a door lock, a window, a generator, a battery, an accelerator, and a throttle.

13. A real-time vehicle recovery system including stop and control box that restricts unauthorized use of a vehicle according to claim 1, wherein said real-time vehicle recovery system further includes at least one of a transmitter, a mobile phone, a digital phone, a cellular phone for tracking the vehicle.

14. A real-time vehicle recovery system including stop and control box that restricts unauthorized use of a vehicle according to claim 1, further comprising a global positioning system responsively connectable to said controller, and proving tracking capability of the vehicle.

15. A real-time vehicle recovery system including stop and control box that restricts unauthorized use of a vehicle according to claim 1, wherein said controller activates a vehicle alarm and vehicle lights responsive to receipt of the page signal request.

16. A real-time vehicle recovery system including stop and control box that restricts unauthorized use of a vehicle according to claim 1, wherein said controller includes an output/input counter and switch relay system that performs one or more of the reducing and terminating functions of the controller.

17. A real-time vehicle recovery system including a stop and control box that restricts unauthorized use of a vehicle according to claim 1, further comprising a supplemental power supply to power said pager and said controller when the power to the vehicle is terminated.

18. A real-time vehicle recovery system including a stop and control box that restricts unauthorized use of a vehicle according to claim 1, wherein said real-time vehicle recovery system is substantially stored in the stop and control box to prevent unauthorized access thereto and the vehicle.

19. A real-time vehicle recovery system including a stop and control box that restricts unauthorized use of a vehicle according to claim 1, wherein the stop and control box is stored in or on the vehicle.

20. A real-time vehicle recovery method administered in a stop and control box, said method restricting unauthorized use of a vehicle, comprising the steps of:
   (a) receiving a page signal request initiated by a user via a receiver of a pager, the page signal request indicating that the vehicle is being used in an unauthorized manner;
   (b) outputting an output signal indicative of the page signal request from the pager;
   (c) receiving the output signal via a controller; and
   (d) performing a real-time controlled operation while the vehicle is in operation, the real-time controlled operation including at least one of terminating power to the vehicle to bring the vehicle to a stop, terminating fuel to the vehicle to bring the vehicle to a stop, reducing fuel or energy to the vehicle to slow the vehicle down, and selectively at least one of terminating and reducing power to at least one energized system in the vehicle used to at least one of control, propel and drive the vehicle, via the controller.

21. A real-time vehicle management system including a security function that restricts unauthorized access thereto, comprising:
   a pager having a receiver for receiving a page signal request initiated by a user and an output port for outputting an output signal indicative of the page signal request, the page signal request indicating that the vehicle is to be controlled or operations relating to the vehicle are to be recorded in a predetermined manner;
   a controller responsively connected to said pager, receiving the output signal and performing a real-time controlled operation while the vehicle is in operation, the real-time controlled operation including at least one of controlling the vehicle and recording the operations of the vehicle responsive to the output signal.

22. A real-time vehicle management system including a security function that restricts unauthorized access thereto according to claim 21, wherein said real-time vehicle recovery system is substantially stored in the stop and control box to prevent unauthorized access thereto and the vehicle.

23. A real-time vehicle management system including a security function that restricts unauthorized access thereto according to claim 21, further comprising a multiple stage shut down valve operably connected to said controller, and at least one of decreasing flow of fuel to the engine and increasing flow of fuel to an engine return.

24. A real-time vehicle management system including a security function that restricts unauthorized access thereto according to claim 21, further comprising a multiple stage shut down valve operably connected to said controller, and at least one of incrementally decreasing flow of fuel to the engine and incrementally increasing flow of fuel to an engine return, to achieve at least two of controlled movement of the vehicle, engine idling, and engine shutdown.

25. A real-time vehicle management system including a security function that restricts unauthorized access thereto according to claim 24, wherein the multiple stage shut down valve is at least one of incrementally decreased and increased responsive to at least one separate page signal requests separately initiated by the user and a predetermined time interval.

26. A real-time vehicle management system including a security function that restricts unauthorized access thereto according to claim 24, wherein the multiple stage shut down valve includes a plurality of valve plugs in series configuration corresponding to the at least two of controlled movement of the vehicle, engine idling, and engine shutdown.

27. A real-time vehicle management system including a security function that restricts unauthorized access thereto according to claim 24, wherein the multiple stage shut down valve includes a plurality of valve plugs in parallel configuration corresponding to the at least two of controlled movement of the vehicle, engine idling, and engine shutdown.

28. A real-time vehicle management system including a security function that restricts unauthorized access thereto according to claim 21, further comprising a main power supply powering the vehicle and a supplemental power supply connected to said pager and said controller, wherein said main power supply is controllable by said controller such that said main power supply is selectively disconnected or regulated responsive to at least one of predetermined criteria and tampering of said real-time vehicle recovery system detected by sensors.

29. A real-time vehicle management system including a security function that restricts unauthorized access thereto according to claim 21, further comprising an input override device and a vehicle operator notification device responsively connected to said controller, and wherein when the page signal request is received by said controller, said controller transmits the page signal request to said vehicle operator notification device to notify the vehicle operator, and wherein the vehicle operator overrides said real-time vehicle recovery system using said input override device.

30. A real-time vehicle management system including a security function that restricts unauthorized access thereto according to claim 29, wherein the vehicle operator overrides said real-time vehicle recovery system using said input override device when the page signal request is incorrect.

31. A real-time vehicle management system including a security function that restricts unauthorized access thereto according to claim 21, wherein the output port of said pager comprises a microjack output.

32. A real-time vehicle recovery system including stop and control box that restricts unauthorized use of a vehicle, comprising:
a pager having a reset function and a receiver for receiving a page signal request initiated by a user and an output port for outputting an output signal indicative of the page signal request, the page signal request indicating that the vehicle is being used in an unauthorized manner;
a memory storing a page signal reference;
a controller responsively connected to said pager and said memory, receiving the output signal and performing a real-time controlled operation while the vehicle is in operation, the real-time controlled operation including at least one of, responsive to detected movement of the vehicle and a comparison of the output signal with the page signal request, terminating power to the vehicle to bring the vehicle to a stop, terminating fuel to the vehicle to bring the vehicle to a stop, reducing fuel or energy to the vehicle to slow the vehicle down, selectively resetting said pager, and selectively at least one of terminating and reducing power to at least one energized system in the vehicle used to at least one of control, propel and drive the vehicle;
a main power supply supplying power to the vehicle; and
a supplemental power supply supplying power to said pager and said controller when said main power to the vehicle is terminated,
wherein said real-time vehicle recovery system is substantially stored in the stop and control box to prevent unauthorized access thereto and the vehicle, and the stop and control box is stored in or on the vehicle.

33. A real-time automobile recording system for an automobile, comprising:
at least one operation sensor recording the operations of the automobile as a recording signal;
a memory located in or on the automobile in a secure manner, storing the operations of the automobile;
at least one of a transmitting and receiving device, a processor and a transceiver responsively connected to said at least one operation sensor and said memory, receiving the recording signal from said operation sensor and transmitting the recording signal to said memory located in or on the automobile in a secure manner and providing a real-time automobile recording function for use in assessing automobile function including the operations of the automobile operation and simultaneous operator function and physical condition; and
a secure enclosure housing said memory and protecting said memory from unauthorized access thereto.

34. In a real-time vehicle management system including a security function that restricts unauthorized access thereto, including at least one of a transmitting and receiving device and a transceiver having a receiver for receiving a page signal request initiated by a user and an output port for outputting an output signal indicative of the page signal request, the page signal request indicating that the vehicle is to be controlled or operations relating to the vehicle are to be recorded in a predetermined manner, and a controller at least one of controlling the vehicle and recording the operations of the vehicle responsive to the output signal, a multiple stage shut down valve operably connected to said controller, comprising:
a plurality of valve plugs in at least one of series and parallel configuration corresponding to at least one of controlled movement of the vehicle, engine idling, and engine shutdown, said plurality of valve plugs performing controlled operation while the vehicle is in operation, the real-time controlled operation including at least one of incrementally decreasing flow of fuel to the engine and incrementally increasing flow of fuel to an engine return, to achieve the at least one of controlled movement of the vehicle, engine idling, and engine shutdown.

35. A real-time vehicle recovery system including a stop and control box that restricts unauthorized use of a vehicle according to claim 34, further comprising a main power supply powering the vehicle and a supplemental power supply connected to said pager and said controller, wherein said main power supply is controllable by said controller such that said main power supply is selectively disconnected or regulated responsive to at least one of predetermined criteria and tampering of said real-time vehicle recovery system detected by sensors.

36. A real-time vehicle recovery system including a stop and control box that restricts unauthorized use of a vehicle according to claim 34, further comprising an input override device and a vehicle operator notification device responsively connected to said controller, and wherein when the page signal request is received by said controller, said controller transmits the page signal request to said vehicle operator notification device to notify the vehicle operator, and wherein the vehicle operator overrides said real-time vehicle recovery system using said input override device.

37. A real-time vehicle or equipment recording and optionally reporting system for a vehicle located on or remote from the vehicle, comprising:
- at least one operation sensor recording the operations of the vehicle as a recording signal, the recording signal used to assist in providing accountable automated and remote control relating to usage of the vehicle or the equipment;
- a memory located in or on the automobile/machinery in a secure manner, storing the operations of the automobile received from said operation sensor in a secure manner;
- a secure enclosure housing said memory and protecting said memory from unauthorized access thereto, and protecting said memory from external elements and impact;
- a processor responsively connectable to said memory, receiving the recording signal, and providing accountable automated remote control for use in assessing at least one of vehicle or equipment function while the vehicle or equipment is in operation and simultaneous operator function and physical condition,
- at least one of a transmitting and receiving device and a transceiver including at least one of: a pager, a wireless phone, a radio frequency equipment, a locating equipment system, and a mobile telephone, receiving the recording signal and transmitting the recording signal in real-time to a redundant remote storage unit in at least one remote location using at least one application specific industry standard protocol as determined by at least one of codes, specifications, rules, regulations, data handling procedures and laws for at least one of the vehicle and the equipment.

38. A real-time vehicle or equipment recording and optionally reporting system according to claim 37, wherein said secure enclosure further comprises an accountable stop and control box housing at least said memory, and wherein the accountable stop and control box is stored in or on the vehicle or the equipment in a secure manner.

39. A real-time automobile recording system for a vehicle or equipment, comprising:
- at least one operation sensor recording the operations of the vehicle or the equipment as a recording signal;
- a memory located in or on the vehicle or the equipment in a secure manner, storing the operations of the vehicle to the equipment;
- at least one of a transmitting and receiving device and a transceiver responsively connected to said at least one operation sensor and said memory, receiving the recording signal from said operation sensor and transmitting the recording signal to said memory located in or on the vehicle to the equipment in a secure manner and providing a real-time vehicle recording function for use in assessing vehicle function including the operations of the vehicle; and
- a secure enclosure housing said memory and protecting said memory from unauthorized access thereto, wherein said secure enclosure comprises an accountable stop and control box housing at least said memory, and wherein the accountable stop and control box is stored in or on the vehicle or the equipment in a secure manner.

* * * * *